US012688615B2

(12) United States Patent
Smith et al.

(10) Patent No.: US 12,688,615 B2
(45) Date of Patent: Jul. 21, 2026

(54) LIBRARY-BASED ROCK THIN SECTION INTERPRETATION USING IMAGE ENCODERS

(71) Applicant: Saudi Arabian Oil Company, Dhahran (SA)

(72) Inventors: Robert Smith, Dhahran (SA); Mustafa A. Al Ibrahim, Safwa (SA); Venkat Suryanar Pathi, Dhahran (SA); Sahyun Hong, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 267 days.

(21) Appl. No.: 18/543,792

(22) Filed: Dec. 18, 2023

(65) Prior Publication Data

US 2025/0200807 A1       Jun. 19, 2025

(51) Int. Cl.
*G06T 9/00*       (2006.01)
*G06V 10/44*      (2022.01)
*G06V 10/74*      (2022.01)

(52) U.S. Cl.
CPC ............... *G06T 9/00* (2013.01); *G06V 10/44* (2022.01); *G06V 10/761* (2022.01)

(58) Field of Classification Search
CPC ........ G06T 9/00; G06V 10/44; G06V 10/761; G06V 10/764; G06V 10/82
See application file for complete search history.

(56) References Cited

U.S. PATENT DOCUMENTS

| 9,134,457 | B2 * | 9/2015 | Hurley | ..................... G01V 20/00 |
| 11,320,357 | B2 * | 5/2022 | Duke | ........................ G06T 7/30 |

(Continued)

FOREIGN PATENT DOCUMENTS

| CN | 111414954 | 7/2020 |

OTHER PUBLICATIONS

Al Ibrahim et al., "An Automated Petrographic Image Analysis System: Capillary Pressure Curves Using Confocal Microscopy," Prepared for presentation at the SPE Annual Technical Conference and Exhibition held in San Antonio, Texas, Oct. 8-10, 2012, 21 pages.

(Continued)

*Primary Examiner* — Tom Y Lu
(74) *Attorney, Agent, or Firm* — Fish & Richardson P.C.

(57) ABSTRACT

Example methods and systems for library-based rock thin section interpretation using image encoders are disclosed. One example method includes obtaining multiple images of rock thin sections, where each of the multiple images is associated with a respective rock thin section interpretation and a respective image encoding vector. An image of a rock thin section with unknown properties is obtained and encoded using an image encoder to generate an image encoding vector, where the image encoder includes a machine learning based image encoding model or a statistical image feature-based encoder. One or more images from the multiple images are selected based on the image encoding vector of the image and the respective image encoding vector for each of the multiple images of rock thin sections. The respective rock thin section interpretation of each of the one or more images is provided for interpreting the rock thin section with unknown properties.

20 Claims, 16 Drawing Sheets

(56) References Cited

U.S. PATENT DOCUMENTS

| | | | |
|---|---|---|---|
| 11,816,779 B2* | 11/2023 | Lakshminarayana | ........................ |
| | | | G06N 3/0455 |
| 12,140,725 B2* | 11/2024 | AlSinan | .................... G01V 5/12 |
| 2016/0307312 A1* | 10/2016 | Sungkorn | ............. G06T 7/0004 |
| 2022/0207079 A1 | 6/2022 | Shebl et al. | |

OTHER PUBLICATIONS

Bromley et al., "Signature Verification using a "Siamese" Time Delay Neural Network," Proceedings of the 6th International Conference on Neural Information Processing Systems (NIPS'93), 1993, pp. 737-744, 8 pages.

Budennyy et al., "Image processing and machine learning approaches for petrographic thin section analysis," Prepared for presentation at SPE Russian Petroleum Technology Conference held in Moscow, Russia, Oct. 16-18, 2017, 11 pages.

Caron et al., "Unsupervised Learning of Visual Features by Contrasting Cluster Assignments," 34th Conference on Neural Information Processing Systems (NeurIPS 2020), 2020, 13 pages.

Chen et al., "A Simple Framework for Contrastive Learning of Visual Representations," Proceedings of the 37th International Conference on Machine Learning, 2020, 11 pages.

Chen et al., "Deep Learning for Instance Retrieval: A Survey," CoRR, arXiv:2101.11282v4, Oct. 30, 2022, 20 pages.

Chen et al., "Exploring Simple Siamese Representation Learning," CoRR, arXiv:2011.10566v1, Nov. 20, 2020, 10 pages.

Coelho, "Mahotas: Open source software for scriptable computer vision," CoRR, arXiv:1211.4907v2, Jan. 5, 2013, 13 pages.

De Lima et al., "Petrographic microfacies classification with deep convolutional neural networks," Computers & Geosciences, Sep. 2020, 142(104481):1-11, 11 pages.

Deng et al., "ImageNet: a Large-Scale Hierarchical Image Database," 2009 IEEE Conference on Computer Vision and Pattern Recognition, Jun. 20-25, 2019, 8 pages.

Dickson, "Carbonate identification and genesis as revealed by staining," Journal of Sedimentary Research, Jun. 1966, 36(2):491-505, 15 pages.

Dosovitskiy et al., "An Image is Worth 16×16 Words: Transformers for Image Recognition at Scale," CoRR, arXiv:2010.11929v2, Jun. 3, 2021, 22 pages.

Folk, "A comparison chart for visual percentage estimation," Journal of Sedimentary Research, 1951, 21(1):32-33, 2 pages.

Goldberg et al., "The Open Microscopy Environment (OME) Data Model and XML File: Open Tools for Informatics and Quantitative Analysis in Biological Imaging," Genome Biology, Feb. 2005, 6(5):R47.1-R47.13, 13 pages.

Gordo et al., "Deep Image Retrieval: Learning Global Representations for Image Search," Computer Vision—ECCV 2016, Oct. 11-14, 2016, pp. 241-257, 17 pages.

Grove et al., "jPOR: An ImageJ macro to quantify total optical porosity from blue-stained thin sections," Computers & Geosciences, Nov. 2011, 37(11):1850-1859, 10 pages.

Habrat et al., "Granulation-Based Reverse Image Retrieval for Microscopic Rock Images," 20th International Conference Amsterdam, The Netherlands, Jun. 3-5, 2020, pp. 74-86, 13 pages.

Halawani et al., "Fundamentals and Applications of Image Retrieval: An Overview," Datenbank-Spektrum, Jan. 2006, 18:14-23, 10 pages.

Hameed et al., "Content-based image retrieval: A review of recent trends," Cogent Engineering, Jan. 2021, 8(1927469):1-37, 37 pages.

Haralick et al., "Textural Features for Image Classification," IEEE Transactions on Systems, Man, and Cybernetics, Nov. 1973, SMC-3(6):610-621, 12 pages.

Harris et al., "Array programming with NumPy," Nature, Sep. 16, 2020, 585:357-362, 6 pages.

He et al., "Deep Residual Learning for Image Recognition," CoRR, arXiv:1512.03385v1, Dec. 15, 2015, 12 pages.

Hinton et al., "Stochastic Neighbor Embedding," Advances in Neural Information Processing Systems 15 (NIPS 2002), 2002, 8 pages.

Hu, "Visual pattern recognition by moment invariants," IRE Transactions on Information Theory, Feb. 1962, pp. 179-187, 9 pages.

Hunter, "Matplotlib: A 2D Graphics Environment," Computing in Science and Engineering, May 2007, 9(3):90-95, 6 pages.

Kirillov et al., "Segment Anything," CoRR, arXiv:2304.02643v1, Apr. 5, 2023, 30 pages.

Linkert et al., "Metadata matters: access to image data in the real world," Journal of Cell Biology, May 31, 2010, 189(5):777-782, 6 pages.

Liu et al., "Using deep-learning to predict Dunham textures and depositional facies of carbonate rocks from thin sections," Geoenergy Science and Engineering, 227(211906):1-13, 13 pages.

Ma et al., "Image analysis of rock thin section based on machine learning," International Geophysical Conference, Qingdao, China, Apr. 17-20, 2017, 4 pages.

Marzeh et al., "Algorithm for finding the largest inscribed rectangle in polygon," Journal of Algorithms and Computation, Available online Jun. 1, 2019, 51(1):29-41, 13 pages.

McInnes et al., "UMAP: Uniform Manifold Approximation and Projection," The Journal of Open Source Software, Sep. 2, 2018, 3(29):861, 1 page.

Moore et al., "OME-NGFF: a next-generation file format for expanding bioimaging data-access strategies," Nature Methods, Nov. 29, 2021, 18:1496-1498, 3 pages.

Orlandi et al., "Oblivious Neural Network Computing via Homomorphic Encryption," EURASIP Journal on Information Security, Jul. 24, 2007, 2007(37343):1-11, 11 pages.

Paszke et al., "PyTorch: An Imperative Style, High-Performance Deep Learning Library," Advances in Neural Information Processing Systems 32 (NeurIPS 2019), 2019, 12 pages.

Power, Jr., et al., "Optical Diffraction Analysis of Petrographic Thin Sections: A microscope with mercury vapor illumination can be used to analyze thin sections vial optical diffraction," Science, Oct. 18, 1974, 186(4160):234-239, 6 pages.

Preibisch et al., "Globally optimal stitching of tiled 3D microscopic image acquisitions," Bioinformatics, Jun. 2009, 25(11):1463-1465, 3 pages.

Qin et al., "U²-Net: Going deeper with nested U-structure for salient object detection," Pattern Recognition, Oct. 2020, 106(107404):1-12, 12 pages.

Rocklin, "Dask: Parallel Computation with Blocked algorithms and Task Scheduling," Proc. of the 14th Python in Science Conf., 2015, pp. 126-132, 7 pages.

Rubo et al., "Digital petrography: Mineralogy and porosity identification using machine learning algorithms in petrographic thin section images," Journal of Petroleum Science and Engineering, Dec. 2019, 183(106382):1-14, 14 pages.

Ruzyla et al., "Staining method for recognition of pore space in thin and polished sections," Journal of Sedimentary Research, Jul. 1, 1987, 57(4):777-778, 2 pages.

Tang et al., "Machine learning for point counting and segmentation of arenite in thin section," Marine and Petroleum Geology, Oct. 2020, 120(104518):1-17, 17 pages.

Tolias et al., "Particular object retrieval with integral max-pooling of CNN activations," CoRR, arXiv:1511.05879v2, Feb. 24, 2016, 12 pages.

Virtanen et al., "SciPy 1.0: fundamental algorithms for scientific computing in Python," CoRR, arXiv:1907.10121v1, Jul. 23, 2019, 22 pages.

Yanguas et al., "Blue fluorescent dye technique for recognition of microporosity in sedimentary rocks," Journal of Sedimentary Research, Jul. 1, 1985, 55(4):600-602, 3 pages.

zenodo.org [online], "napari: a multi-dimensional image viewer for Python," May 31, 2022, retrieved on May 30, 2024, retrieved from URL <https://zenodo.org/records/3555621>, 14 pages.

* cited by examiner

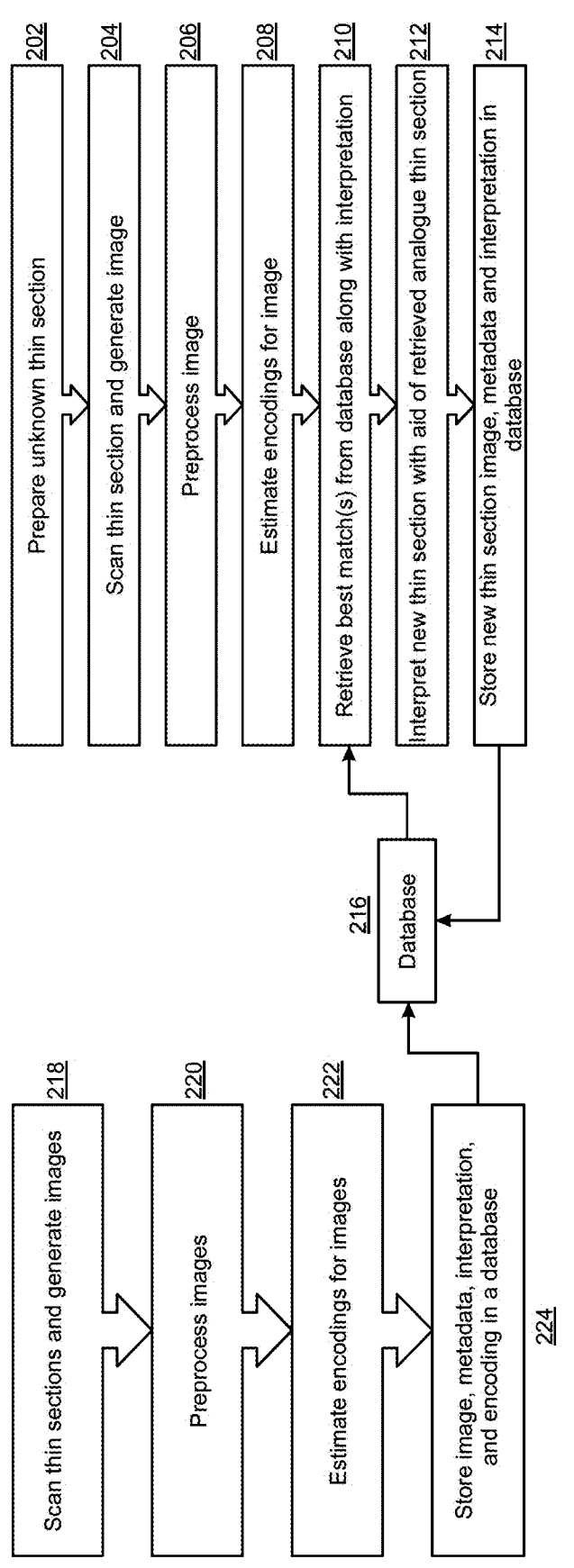

200

202 Prepare unknown thin section

204 Scan thin section and generate image

206 Preprocess image

208 Estimate encodings for image

210 Retrieve best match(s) from database along with interpretation

212 Interpret new thin section with aid of retrieved analogue thin section

214 Store new thin section image, metadata and interpretation in database

216 Database

218 Scan thin sections and generate images

220 Preprocess images

222 Estimate encodings for images

224 Store image, metadata, interpretation, and encoding in a database

FIG. 2

"Unstructured" Reports          Structured data          Unorganized images

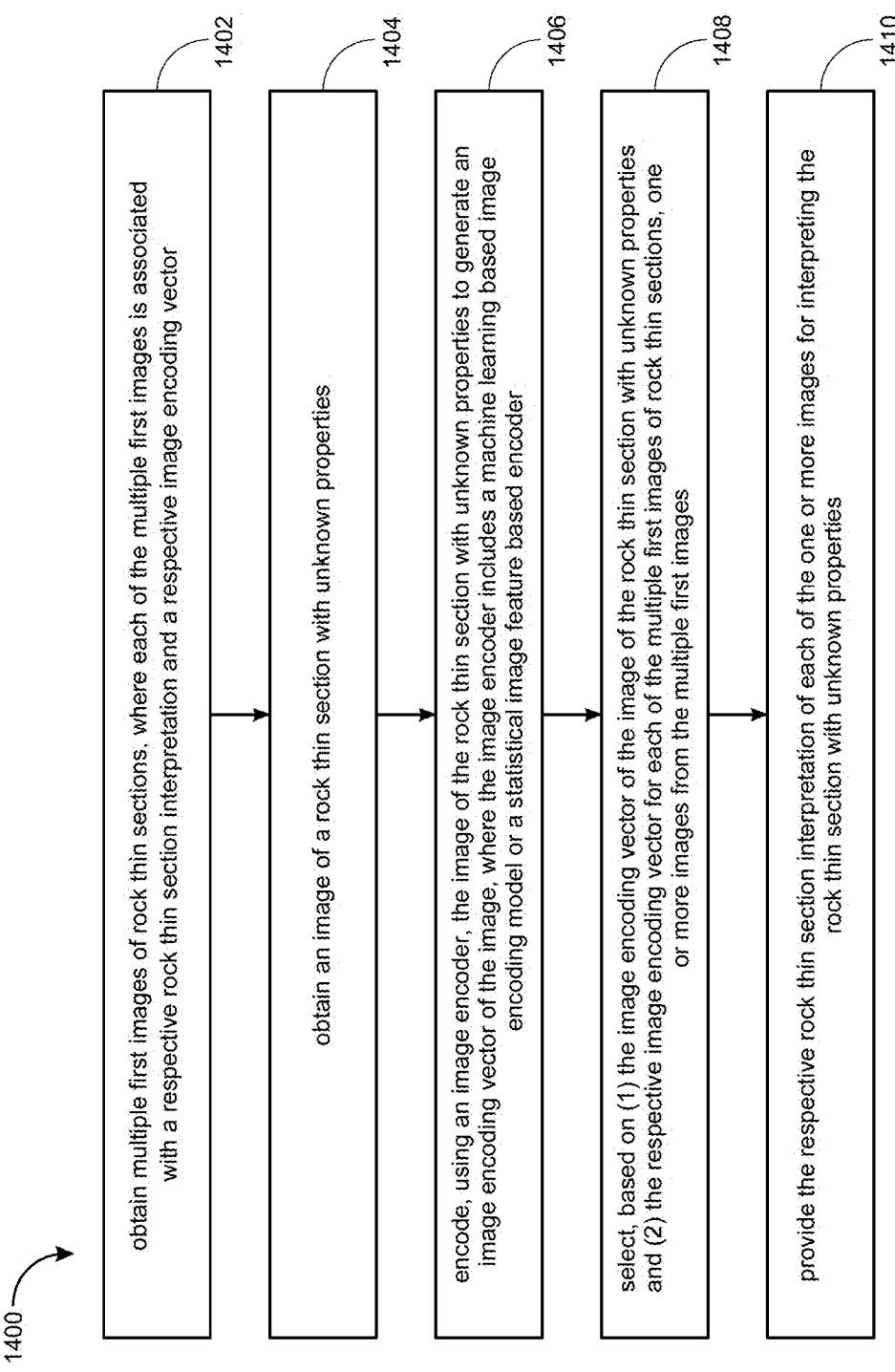

1400

1402 obtain multiple first images of rock thin sections, where each of the multiple first images is associated with a respective rock thin section interpretation and a respective image encoding vector 1404 obtain an image of a rock thin section with unknown properties 1406 encode, using an image encoder, the image of the rock thin section with unknown properties to generate an image encoding vector of the image, where the image encoder includes a machine learning based image encoding model or a statistical image feature based encoder 1408 select, based on (1) the image encoding vector of the image of the rock thin section with unknown properties and (2) the respective image encoding vector for each of the multiple first images of rock thin sections, one or more images from the multiple first images 1410 provide the respective rock thin section interpretation of each of the one or more images for interpreting the rock thin section with unknown properties

FIG. 14

LIBRARY-BASED ROCK THIN SECTION INTERPRETATION USING IMAGE ENCODERS

TECHNICAL FIELD

The present disclosure relates to computer-implemented methods and systems for library-based rock thin section interpretation using image encoders.

BACKGROUND

Rock thin section analysis and interpretation can be used for understanding subsurface rocks. Rock thin section analysis and interpretation can be done manually by expert petrographers that look under the microscope and make qualitative to semi-quantitative interpretation of a rock thin section. The results can be recorded and utilized in subsequent hydrocarbon production workflows.

SUMMARY

The present disclosure involves methods and systems for library-based rock thin section interpretation using image encoders. One example method includes obtaining multiple first images of rock thin sections, where each of the multiple first images is associated with a respective rock thin section interpretation and a respective image encoding vector. An image of a rock thin section with unknown properties is obtained. The image of the rock thin section with unknown properties is encoded using an image encoder to generate an image encoding vector of the image, where the image encoder includes a machine learning based image encoding model or a statistical image feature-based encoder. One or more images from the multiple first images are selected based on (1) the image encoding vector of the image of the rock thin section and (2) the respective image encoding vector for each of the multiple first images of rock thin sections. The respective rock thin section interpretation of each of the one or more images is provided for interpreting the rock thin section with unknown properties.

The previously described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the image encoder includes the machine learning based image encoding model, and before the multiple first images of rock thin sections are obtained, the machine learning based image encoding model is trained in a self-supervised learning process and based on a second plurality of images of rock thin sections. The respective image encoding vector of each of the first plurality of images is generated using the trained machine learning based image encoding model.

In some implementations, the machine learning based image encoding model includes a convolutional neural network (CNN) backbone and a multilayer perceptron (MLP) head.

In some implementations, the image encoder includes the statistical image feature-based encoder, and the image encoding vector of the image of the rock thin section with unknown properties includes Haralick features of the image of the rock thin section with unknown properties.

In some implementations, selecting the one or more images from the multiple first images includes determining a respective distance between the image encoding vector of the image of the rock thin section with unknown properties and the respective image encoding vector for each of the first plurality of images of rock thin sections, and selecting, based on the determined respective distance between the image encoding vector of the image of the rock thin section with unknown properties and the respective image encoding vector for each of the multiple first images of rock thin sections, the one or more images from the multiple first images.

In some implementations, after the respective rock thin section interpretation of each of the one or more images is provided for interpreting the rock thin section with unknown properties, the image of the rock thin section with unknown properties and the interpretation of the image are stored in a database that stores the multiple first images of rock thin sections.

In some implementations, obtaining the multiple first images of rock thin sections includes obtaining, from a database, each of the multiple first images of rock thin sections, the respective rock thin section interpretation, and the respective image encoding vector.

In some implementations, obtaining the image of the rock thin section with unknown properties includes scanning the rock thin section with unknown properties using a thin section scanner to obtain the image of the rock thin section with unknown properties.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

FIG. 2 illustrates an example of thin section image search workflow steps, according to some implementations.

FIG. 14 illustrates an example process for interpreting rock thin sections, according to some implementations.

Like reference numbers and designations in the various drawings indicate like elements.

DETAILED DESCRIPTION

Figure 1:
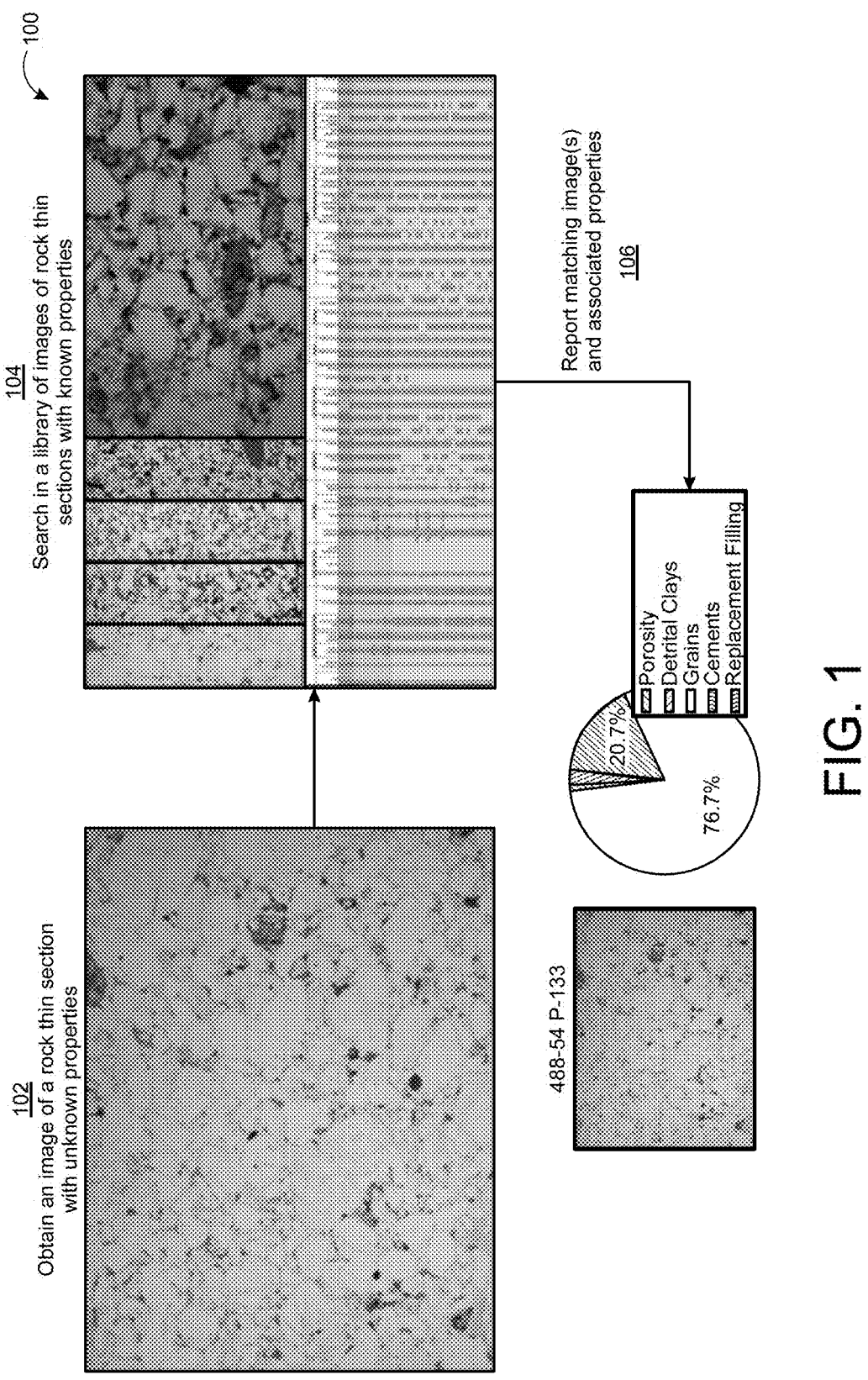
FIG. 1 illustrates an example of thin section image search workflow visualization, according to some implementations.

Rock thin section analysis is one of the geologist's tools to study rocks. For example, rock micro-texture, microfacies, visible porosity, mineralogy/composition, micro-fractures, cementation patterns, and depositional and diagenetic history can be obtained from the thin section under the microscope by an expert petrographer. As such, rock thin section analysis can be used in hydrocarbon exploration and production workflows. In some cases, thin section scanners can image a large number of samples automatically, and image processing techniques can be used to extract quantitative information of the thin sections, for example, visible pore area percentage. In some cases, machine learning (ML) techniques can be used to accelerate and/or automate the interpretation of geologic thin sections. An interpretation of a rock thin section can include visible pore volume, grain size, sorting metric, roundness metric, rock texture, fossils observed, color, pore types, minerals observed and their proportions, fractures observed, and/or dissolution features such as stylolite. Thin section analysis and interpretation can also include information obtained from the aforementioned data, for example, formation name, depositional environment, and/or qualitative reservoir quality descriptor.

This disclosure describes systems and methods that use datasets of images of rock thin sections, associated metadata and interpretations, as well as image processing and/or machine learning techniques, to match rock thin sections of unknown properties to rock thin sections in the datasets. The disclosed methods can automatically provide to a user, for example, a petrographer, legacy thin sections identified from the datasets and closely resembling the rock thin sections of unknown properties in an encoded space.

In some cases, to obtain representations of rock thin sections in an encoded space, the rock thin sections are prepared and imaged using a thin section scanner, images are then preprocessed to remove the background, and the resultant cropped images are encoded into image encoding vectors using either an image-processing-based encoder or a machine-learning-based encoder. An image encoding vector of an image is a vector of numbers that summarizes the image with the goal that similar images have similar encodings. Each number in the image encoding vector can represent a feature of the image. The image encoding vectors are then stored for access later.

In some cases, given a user-provided thin section with unknown properties, the image encoding vector of an image of the user-provided thin section is generated, and the distance between this image encoding vector and each of the image encoding vectors of thin section images in a dataset is calculated. The thin sections in the dataset with distances smaller than a predefined threshold are returned along with their associated metadata and interpretations. Petrographers can then use this information, rather than an estimation of the properties of the user-provided thin section, as a guide to aid in the interpretation of the user-provided thin section. In some cases, the metadata of a rock thin section can include porosity and grain size of the rock thin section.

The disclosed systems and methods provide many advantages over existing systems. As an example, the disclosed thin section image matching and retrieval as described herein do not rely on interpretations of thin section images by expert petrographers, and therefore avoids potential biases in the interpretations of thin section images introduced by expert petrographers. As another example, the thin section image matching and retrieval enable easy addition of newly interpreted thin sections to the dataset without the need for the retraining of machine learning models, which can be time-consuming. Furthermore, existing metadata and interpretations associated with rock thin sections do not have to be structured, and therefore legacy data with thin section interpretations stored in reports and presentations can be used. Consequently, time-consuming tasks that are usually associated with data formulations in machine learning based methods can be avoided, and the utilization of existing rock thin section related data can be improved. In addition, the disclosed methods do not require rock thin section images to be labeled manually for training machine learning models, and therefore avoid the time-consuming process of labeling images for training machine learning models.

FIG. 1 illustrates an example 100 of thin section image search workflow visualization. For convenience, example 100 will be described as being performed by a system of one or more computers, located in one or more locations, and programmed appropriately in accordance with this specification (e.g., the computer system 1500 of FIG. 15).

At 102, a computer system obtains an image of a rock thin section with unknown properties. At 104, the computer system searches in a library of images of rock thin sections with known properties to find one or more images that match the image of the rock thin section with unknown properties, according to a predefined distance metric. At 106, the computer system reports the one or more images together with their respective properties. In some implementations, a user, for example, an expert petrographer, can use the reported one or more images and their properties to aid in interpreting the rock thin section with unknown properties. Then the image of the rock thin section with unknown properties can be added, together with its interpretation made by the expert petrographer, to the library of images of rock thin sections with known properties. The aforementioned steps in FIG. 1 will be described in more detail later when FIG. 2 is described.

FIG. 2 illustrates an example 200 of thin section image search workflow steps. For convenience, example 200 will be described as being performed by a system of one or more computers, located in one or more locations, and programmed appropriately in accordance with this specification (e.g., the computer system 1500 of FIG. 15).

At 202, a rock thin section with unknown properties is prepared from rock samples. At 204, a computer system scans the prepared rock thin section using a tool, for example, a thin section scanner, to obtain an image of a whole slide of the prepared thin section. In some implementations, 202 to 204 in FIG. 2 can correspond to 102 in FIG. 1.

At 206, the computer system preprocesses the image from 204 to obtain an image ready for thin section analysis. At 208, the computer system applies image-processing or machine learning techniques to obtain an image encoding for the image from 206, using an image encoder. At 210, the computer system uses the image encoding from 208 to search database 216 of thin section images and identify similar thin sections from database 216 that best match the rock thin section with unknown properties. The computer system can also output interpretations associated with the identified thin sections from database 216 that are similar to the rock thin section with unknown properties. In some implementations, the processing workflow from 206 to 210 can be implemented in a computer programming language, for example, Python®, using open-source packages. In some implementations, 206 to 210 in FIG. 2 correspond to 104 to 106 in FIG. 1.

At 212, a user can use the identified thin sections and the associated interpretations to help interpret the rock thin section with unknown properties and to obtain metadata and interpretation of the rock thin section with unknown properties. At 214, the computer system stores in database 216 the thin section image obtained at 206, the associated encoding obtained at 208, metadata, and the interpretation obtained at 212. Additional details of each step outlined above will be further described later.

In some implementations, 218 to 224 in FIG. 2 can be used to generate rock thin section images and the associated encodings, metadata, and interpretations in database 216. At 218, a second computer system, which can be the same as or different than the computer system used at 204, can scan rock thin sections and generate rock thin section images. At 220, the second computer system preprocesses the thin section images from 218. At 222, the second computer system estimates an image encoding for each of the images preprocessed at 220, using the same image encoder that is used at 208. In some implementations, a user, for example, an expert petrographer, can provide interpretation of the thin section associated with each image from 220. At 224, the second computer system stores the images from 220 and the associated encodings, metadata, and interpretations in database 216 that can be used at 210.

Figure 3:
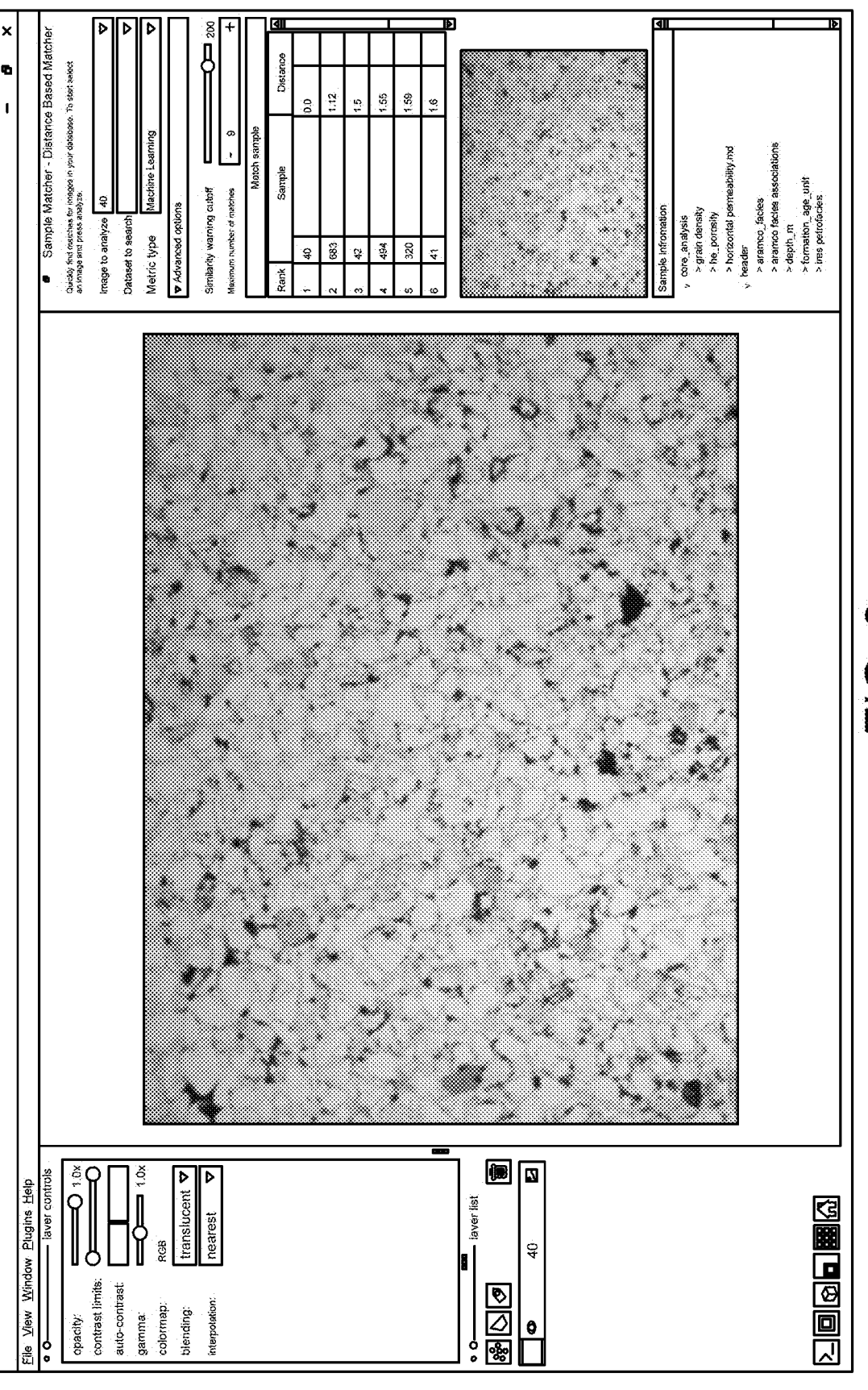
FIG. 3 illustrates an example graphical user interface (GUI) for library-based image matching and retrieval, according to some implementations.

FIG. 3 illustrates an example graphical user interface (GUI) for library-based image matching and retrieval. Given an unknown rock thin section image, for example, the image at the center of FIG. 3, matches can be retrieved and displayed in the GUI along with their metadata and interpretations. In some implementations, the GUI can be designed on top of an image visualizer, for example, an open-source image visualizer. A user can use the GUI to open an image of a rock thin section with unknown properties, search a database of rock thin section images for matches to the image of the rock thin section with unknown properties, preview matches thumbnails and their associated interpretations, and open the thin section images for the matches if they are available.

Figure 4:
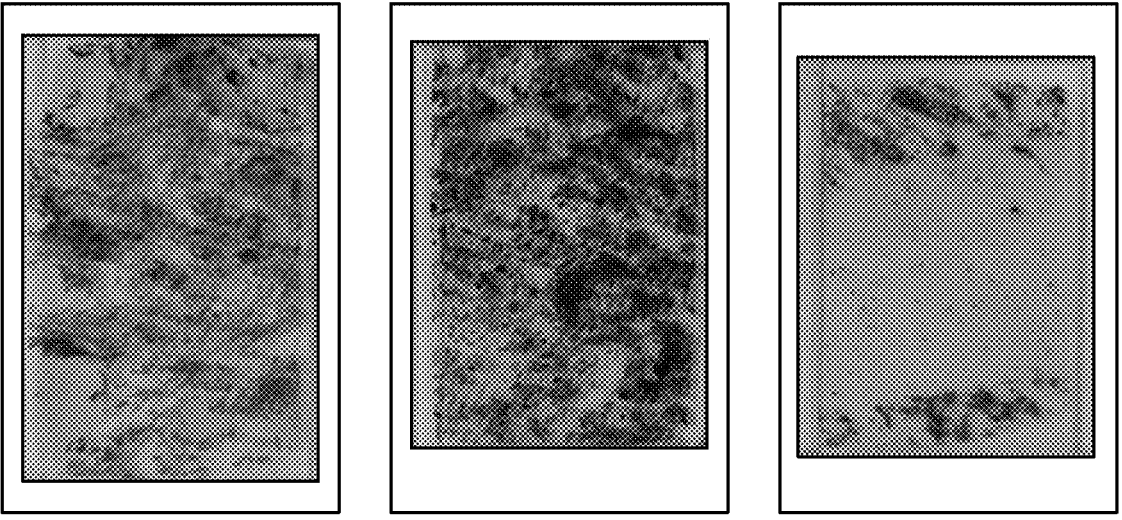
FIG. 4 illustrates example rock thin sections, according to some implementations.

Returning to FIG. 2, as mentioned earlier, at 202, a rock thin section with unknown properties is prepared from rock samples. In some implementations, a rectangular piece of a rock with a depth of about one centimeter can be cut using a rock saw. The piece can be polished using a polishing wheel or manually polished using polishing sandpaper. Water can be used to remove excess dust during the polishing procedure. The polished rock piece can be then dried to remove any excess water from the previous steps by either leaving it in the air or by heating it in a drying oven. Next, a resin (epoxy) can be mixed with a blue dye. The dye can be used to highlight pores under the microscope. In some cases, a fluorescent blue-dye can be used to enable the use of fluorescence microscopy. The epoxy used can be isotropic to enable the transmission of light without change. The mixture of the epoxy and the blue dye can then be poured into a container and the rock piece can be submerged, at least partially, in the mixture. A vacuum impregnation unit can then be used to ensure that the resin fills the pores. Another round of polishing can be performed on the rock piece to remove any excess resin. An ultra-violet (UV) curable epoxy can be used to glue the polished rock piece into a glass slide. UV light can be used to cure the UV curable epoxy. To form a rock thin section from the rock piece, the rock piece is grinded to a predetermined thickness, for example, thirty microns, using a combination of automated grinding machines and manual polishing. Quality checks can be performed on the rock thin section by measuring the thickness of the thin section using a caliber at multiple points and by examining certain minerals under the microscope, e.g., quartz mineral color. In some cases, a thin slide cover can be inserted on the thin section. The glass slide can be assigned a unique id that is stored along with the metadata of the rock thin section. FIG. 4 illustrates example rock thin sections produced using the process described above for 202.

Returning to FIG. 2, as mentioned earlier, at 204, a computer system scans the prepared rock thin section from 202 using a tool, for example, a thin section scanner, to obtain an image of a whole slide of the prepared thin section. In some implementations, the thin section scanner can be used to automatically scan multiple images at high resolution using multiple filters, for example, plane polarized light (PPL) filter, cross-polarized light (XPL) filter, circular polarized light (CPL) filter, and fluorescent light (FL) filter at specific wavelength(s). In some cases, thin section scanners can have a number of advantages over traditional microscopes. For example, thin section scanners can enable scanning of multiple thin sections automatically (e.g., tens of samples). Furthermore, thin section scanners can have hardware that can be boxed to prevent room lighting conditions from affecting the thin section images. Additionally, thin section scanners can have the ability to accurately move the stage to enable for whole slide scanning. For example, an image with an objective 10× or 20× magnification can be obtained by a thin section scanner, but higher magnification can also be obtained by the thin section scanner if needed. In some cases, a 10× magnification of the prepared rock thin section from 202 is sufficient. The thin section scanner stage can be mechanized to automatically obtain multiple overlapping thin section images in a tiled format. The overlapping can be set to 10% but it can be as small as 5% while maintaining image quality. During acquisition of an image of a thin section, multiple focus points can be used throughout the thin section to ensure that the image is focused in multiple areas of the thin section. This can be important if the thickness of the thin section is variable, for example, due to issues during the preparation procedure at 202. After obtaining the tiled thin section images, the computer system can register and stitch the tiled images automatically. The resulting image can then be saved along with its associated acquisition metadata in one or multiple files.

Figures 5A, 5B, 5C, 5D:
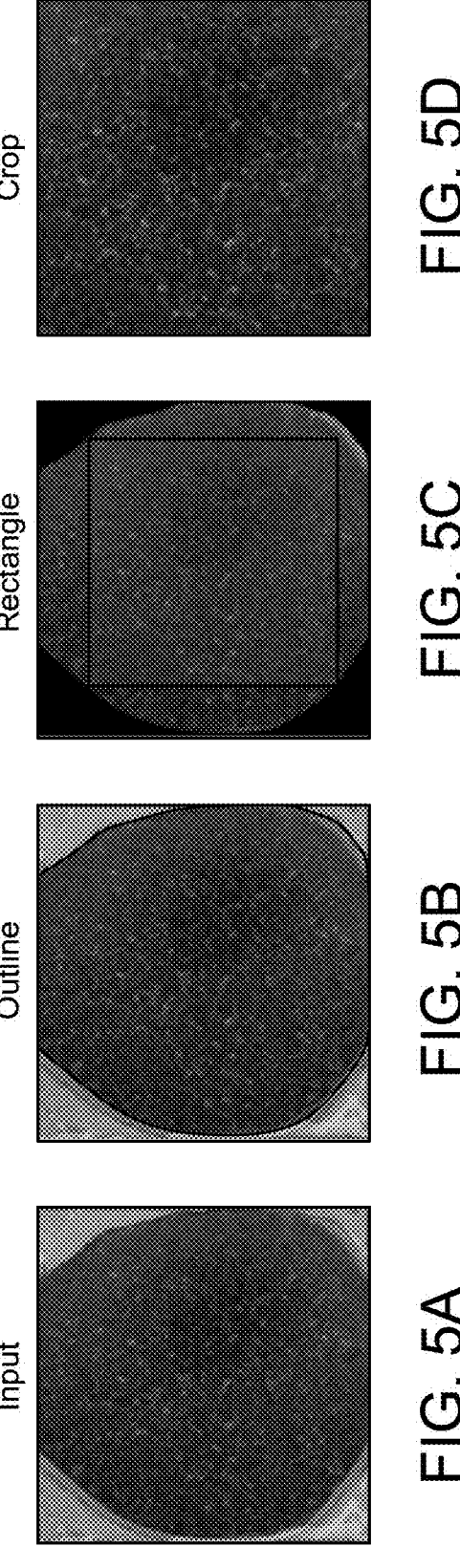
FIGS. 5A to 5D illustrate an example process for rock thin section image preparation, according to some implementations.

As mentioned earlier, at 206, the computer system pre-processes the image from 204 to obtain an image ready for thin section analysis. In some implementations, the image from 204 can be preprocessed using the following steps: 1) load the image, 2) resize the image, 3) identify background of the image, 4) optimize and identify largest rectangular area in the image, and 5) crop the original sized image based on identified scaled rectangle area in the image. FIGS. 5A to 5D illustrate an example process for rock thin section image preparation. In some cases, the example procedure can involve identifying (e.g., outlining, as shown in FIG. 5B) a thin section in an input image from 204 (e.g., FIG. 5A), using a semantic segmentation convolutional neural network (CNN), identifying the largest inscribed rectangular area in the identified thin section (e.g., as shown in FIG. 5C), and cropping the identified rectangular area (e.g., as shown in FIG. 5D). In some cases, the computer system can perform the aforementioned steps automatically. In some cases, manual area selection and cropping can be applied. The computer system can load the cropped image into a storage device, for example, a memory, if the size of the cropped image is relatively small. If the size of the cropped image is relatively large, the computer system can load the cropped image dynamically and process it in chunks. In some cases, to accelerate the preprocessing of the image from 204, the computer system can generate a downscaled image of the cropped image. For example, the width and the height of the image from 204 can be used to identify a scaling factor (SF) in the downscaled image as described in Equation 1 below, where m is the maximum dimension size for the downscaled image, w is the width of the image from 204, and h is the height of the image from 204. The scaling factor can then be used to resize the cropped image.

$$SF = m / \max(w, h) \qquad (1)$$

In some implementations, because the image from 204 may contain background in addition to a rock thin section, the computer system can crop a regular area (e.g., rectangular in shape) within the image from 204, where only the rock thin section in the image from 204 is visible in the regular area, as shown in FIG. 5D. In some cases, the background in the image from 204 can be identified (e.g., outlined) using a convolutional neural network, as shown in FIG. 5B. An example architecture of the CNN can be a U2-Net architecture. Once the background is identified, the computer system can create a mask and use the mask for optimization to find the largest rectangular area of the rock thin section within the image from 204 and without the background. The computer system can scale back the size of the rectangular area identified to the size of the image from 204 using the scaling factor calculated in Equation 1, and then crop the image, resulting in an image (e.g., the image in FIG. 5D) ready for analysis.

Returning to FIG. 2, as mentioned earlier, at 208, the computer system applies image-processing and/or machine learning techniques to obtain an image encoding for the image from 206. An image encoding of an image is a vector of numbers that summarizes the image with the goal that similar images have similar encodings. In some implementations, the computer system can retrieve from database 216 the image encoding of each image calculated at 222 and stored in database 216 at 224. The computer system can compare the image encoding of the image from 206 with the image encoding of each image in database 216. The retrieved encoding of a rock thin section image in database 216, i.e., the summary of a rock thin section image in database 216, can contain information about the definition of similarity between two rock thin section images. For example, when identifying similar thin sections, the general texture of the rock sample used to generate the thin section at 202 can be used to classify the rock type of the thin section. In addition, the amount of porosity, i.e., the percentage of empty space identified in blue color under the microscope, can also be used to identify similar thin sections. In some implementations, the encodings of two geologically similar thin sections are similar.

Figure 6:
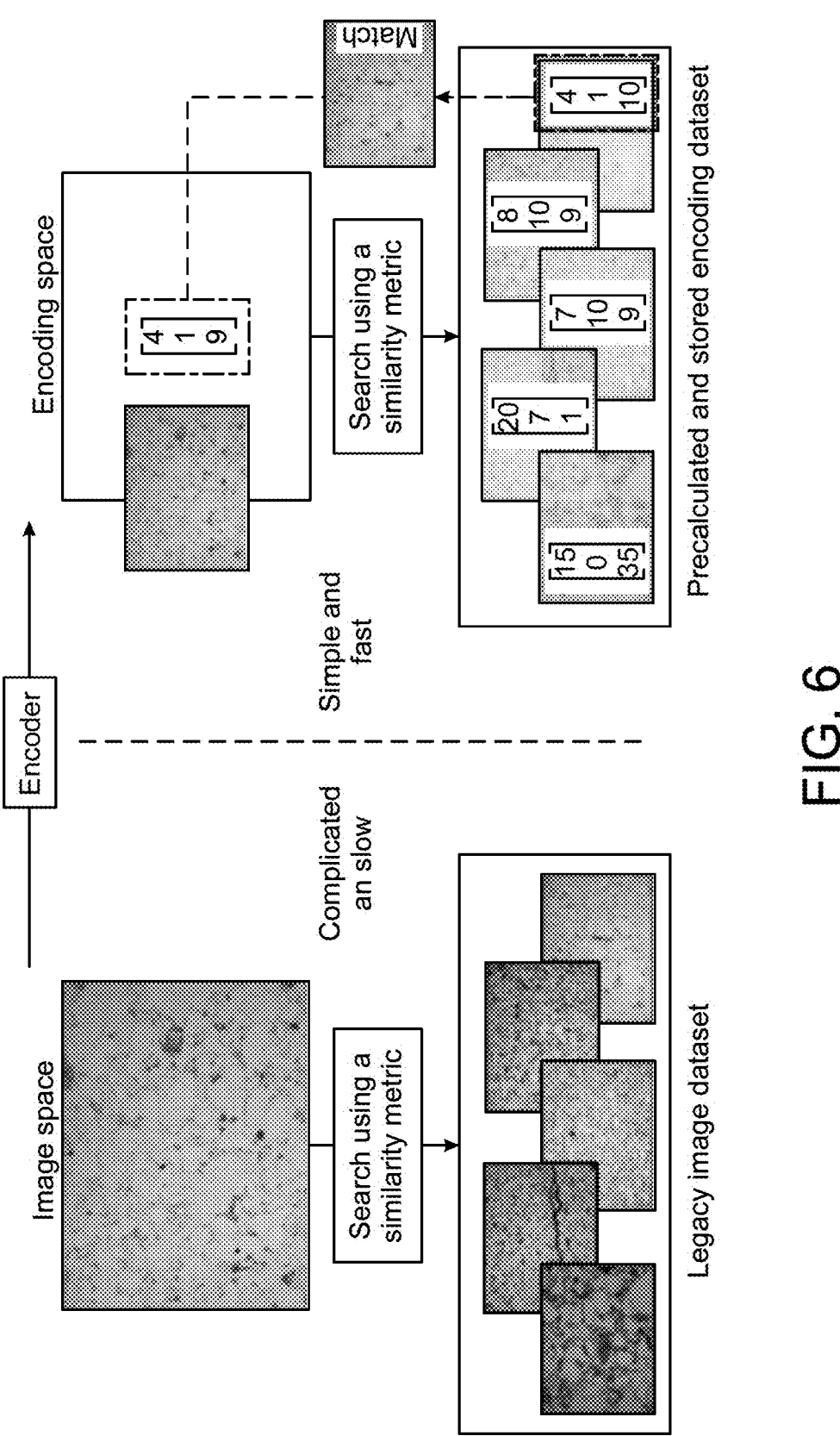
FIG. 6 illustrates an example comparison between image retrieval in the image space and image retrieval in the encoding space, according to some implementations.

FIG. 6 illustrates an example comparison between image retrieval in the image space and image retrieval in the encoding space. In some implementations, numerical comparison of encodings of two images is faster, more accurate, and simpler when compared to a comparison of the two images directly.

In some implementations, a computer system can use statistical features extracted from the pixel values of an image as an image encoding vector of the image. For example, Haralick features extracted from an image can be used as values in the image encoding vector because they are related to the general texture of the image. Example Haralick features extracted from an image can include angular second moment, contrast, correlation, sum of squares of variance, inverse difference moment, sum average, sum variance, sum entropy, entropy, difference variance, difference entropy, information measure of correlation 1, and/or information measure of correlation 2. In some cases, these example features can be computed in 4 directions resulting in up to 52 features used as an image encoding per image. In some cases, the example features can also include image moments of an image.

In some implementations, a computer system can generate an image encoding vector for a given image using neural networks, which can be trained in a self-supervised process, i.e., without human labeled data. An example architecture of the neural networks is the SimSiam architecture, which is based on Siamese networks, to train an image encoding model in a self-supervised manner.

In some implementations, the SimSiam architecture can have several advantages that make it simpler to implement over some other self-supervised methods. Unlike contrastive methods such as SimCLR or swapping assignments between views (SwAV), negative samples and online clustering are not required in the SimSiam architecture during the training process while small batch sizes are also possible, significantly reducing the hardware requirements for training the image encoding model.

Figure 7:
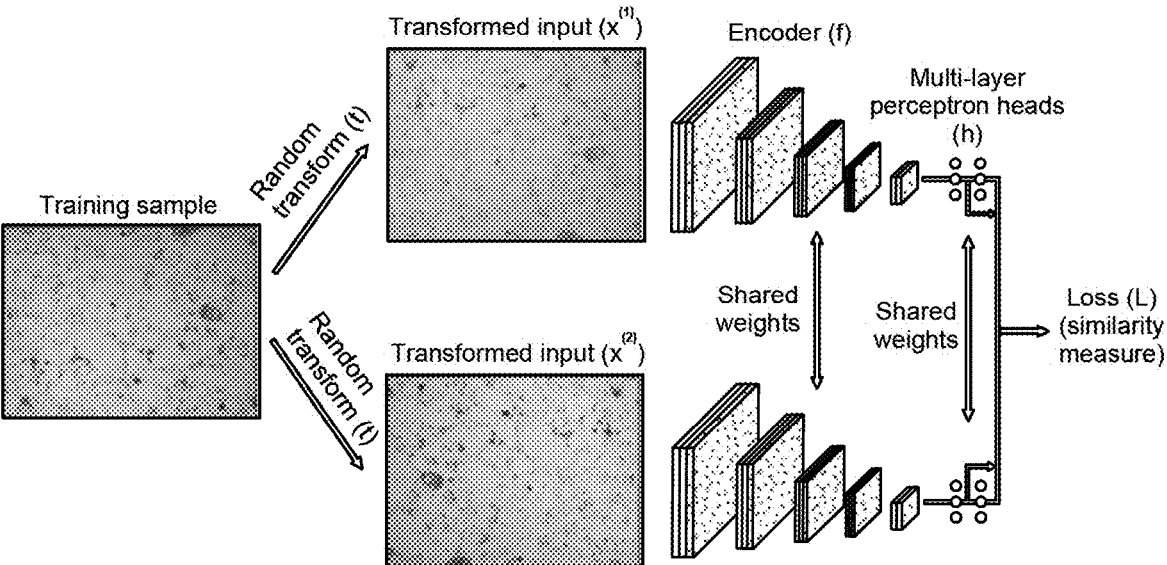
FIG. 7 illustrates an example SimSiam architecture used to train an image encoding model, according to some implementations.

FIG. 7 illustrates an example SimSiam architecture used to train an image encoding model. Two randomly augmented views ($x\hat{}((1))$ and $x\hat{}((2))$) are generated from an input thin section image. The image transformations for augmenting the input thin section image can be selected so that the transformations do not alter the semantic meaning of the input thin section image.

In some implementations, for input rock thin section images, the computer system can apply image transformations such as horizontal/vertical flips, rotation, random noise, and/or color perturbations to augment the input rock thin section images. In some cases, rocks can be layered even at the millimeter/centimeter scale, which is reflected in the rock thin sections. Therefore, thin section images may not be rotation invariant. In some cases, the color perturbation is another aspect that may be changed, depending on the quality of the thin section images. For example, if the thin section images have light contamination, or the thin section preparation procedure at 202 produces thin sections with variable thickness, larger color perturbations may be used to train the image encoding model to recognize similar images with different color variabilities. In some cases, color perturbation also depends on the particular color. For example, a blue dye can be used to make the pores show as blue. When color blue is perturbed, the image encoding model learns that the color blue is not important, when it is actually important. Therefore, in some cases, perturbation to color blue should be avoided. On the other hand, some thin section images can have a magenta hue (because of applied staining), which may not be relevant to the rock type or structure. Therefore, the color magenta can be randomly added to the thin section images so that the image encoding model can learn that color magenta is not important to the interpretation of the thin section images.

In some implementations, significant zooming can alter the apparent grain size and interpretation of the thin section and should be avoided in image transformations.

In some implementations, the two augmented images are processed by an image encoding model, which can include a convolutional neural network backbone (e.g., encoder (f) in FIG. 7) and a multilayer perceptron (MLP) head (e.g., MLP head (h) in FIG. 7). An example image encoding model can include a residual neural network (ResNet) based backbone.

On one branch of the architecture shown in FIG. 7, the encodings are passed through an MLP predictor (h), which can be used to predict the encodings from the second branch. The computer system can use the image encoding model in FIG. 7 to maximize the similarity between the encodings of the two augmented views for semantically similar thin section images.

In some implementations, during the training of the image encoding model in FIG. 7, the computer system can modify the weights of the encoder (f) and multilayer perceptron heads (h) such that the loss function (L) is minimized. An example loss function can be the negative cosine similarity $S_{neg\_cosine}$ as defined in Equation 2 below, where h' corresponds to the vector output of the multilayer perceptron heads. Other loss functions can also be used, for example, cross-entropy similarity.

$$S_{neg\_cosine}\left(x^{(1)}, x^{(2)}\right) = -\frac{\sum_{k=1}^{n} h_k'^{(2)} * h_k'^{(1)}}{\sqrt{\sum_{k=1}^{n} \left(h_k'^{(1)}\right)^2} \sqrt{\sum_{k=1}^{n} \left(h_k'^{(2)}\right)^2}} \quad (2)$$

In some implementations, to accelerate the training of the image encoding model in FIG. 7, the computer system can use transfer learning by utilizing an encoder pre-trained on an external dataset, for example, ImageNet. The computer system can then finetune the pre-trained encoder using the thin section image dataset from database 216. In some cases, the computer system can use any or all available thin section images for the self-supervised training, even if some thin section images do not have associated interpretations, because image interpretation is not required during self-supervised training.

In some implementations, once the training of the image encoding model is completed, the computer system can use the trained image encoding model, including the encoder (f) and the multilayer perceptron layer(s) (h), to encode an input rock thin section image.

In some implementations, to enable for variable image size, the computer system can randomly sample multiple subsamples, e.g., thirty subsamples, from each input thin section image. In some cases, the width and height of each subsample are equal to the size of the input thin section image that can be accommodated by the image encoding model. The computer system can calculate the image encoding of each of these subsamples using the trained image encoding model. The computer system can then average the image encodings across the subsamples to estimate one encoding for each input thin section image. In some cases, and example average method can be an arithmetic average.

Returning to FIG. 2, as mentioned earlier, the computer system can use 218 to 224 to generate database 216 using rock thin section images. In some implementations, at 224, the computer system can use database 216 to store (either locally or on a server) thin section images, low resolution thumbnails of the thin section images, associated metadata and interpretations, and image encodings generated at 222 using either statistical-based image encoding methods described earlier or a trained image encoding model, for example, the trained image encoding model in FIG. 7.

In some implementations, the low-resolution thumbnails can be used for previewing the matched images retrieved at 210 in FIG. 2. In some cases, server storage of database 216 is preferable because it can eliminate the need to replicate data (especially for high-resolution thin section images which can take large amount of storage). The thin section images in database 216 can be saved in open-source formats to maximize compatibility with other software, for example, open microscopy environment-tag image file format (OME-TIFF) and/or OME-ZARR.

In some implementations, visualization of the thin section images in database 216 can be done by first reducing the high dimensional image encoding vector to two or three main directions, e.g., using principle component analysis. Other examples of dimensionality reduction methods can include t-distributed stochastic neighbor embedding (T-SNE) and/or uniform manifold approximation and projection (UMAP). Automated clustering can also be applied to the high dimensional image encoding vectors in database 216, for example, using k-means clustering, to identify similar thin sections in database 216, by mapping the high dimensional image encoding vectors in database 216 into a lower dimension space.

As mentioned earlier, at 210, the computer system uses the image encoding from 208 to search database 216 of thin section images and identify similar thin sections from database 216 that best match the rock thin section with unknown properties. In some implementations, to perform the search at 210, the computer system uses a distance measurement applied between the image encoding from 208 and each image encoding stored in database 216 to calculate the similarity between the thin section image from 206 and each thin section image stored in database 216.

In some implementations, the distance measurement used at 210 can be the Euclidean distance $d_{Euclid}$ as defined in Equation 3 below, where $f_k$ corresponds to the value of the kth feature in an image encoding.

In some implementations, the distance measurement used at 210 can be the cosine distance $d_{cosine}$ as defined in Equation 4 below. This distance measurement measures if two image encoding vectors are pointing towards the same direction and ranges between zero and one, with two image encoding vectors pointing towards the same direction returning zero as the distance measurement between two image encoding vectors.

In some implementations, at 210, given a rock thin section image from 206, the computer system calculates the distance between the image encoding of the rock thin section image calculated at 208 and the image encoding of each thin section image in database 216. This distance calculation is not computationally intensive. The computer system then sorts the distances calculated between the rock thin section image from 206 and each thin section image in database 216, and the computer system returns the matched thin sections in database 216 corresponding to the distances calculated at 210 and smaller than a predetermined threshold, as well as the interpretations associated with the matched thin sections.

$$d_{Euclid}\left(im^{(1)}, im^{(2)}\right) = \sqrt{\sum_{k=1}^{n}\left(f_k^{(2)} - f_k^{(1)}\right)^2} \quad (3)$$

$$d_{cosine}\left(im^{(1)}, im^{(2)}\right) = 1 - \frac{\sum_{k=1}^{n} f_k^{(2)} * f_k^{(1)}}{\sqrt{\sum_{k=1}^{n}\left(f_k^{(1)}\right)^2}\sqrt{\sum_{k=1}^{n}\left(f_k^{(2)}\right)^2}} \quad (4)$$

In some implementations, the computer system can use hierarchal image search to scale up the image search process at 210.

Figure 8:
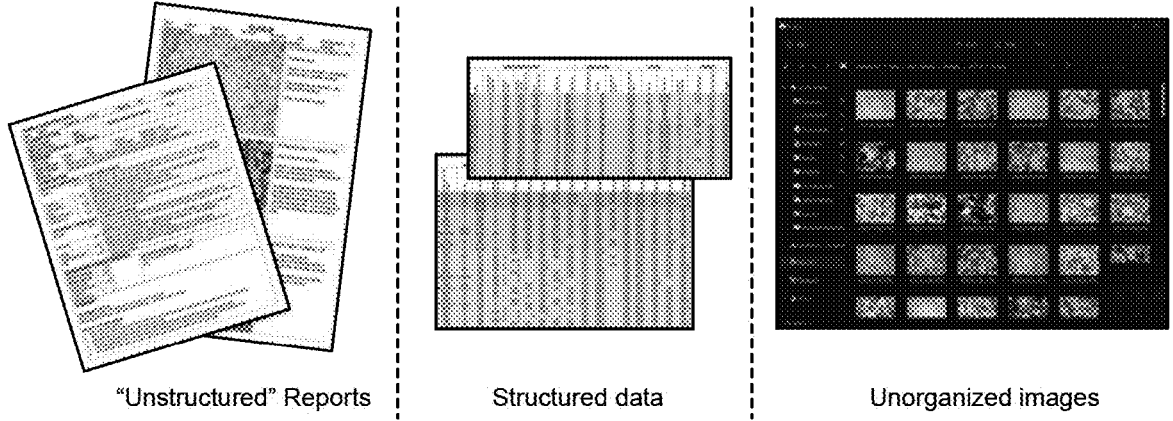
FIG. 8 illustrates examples of data used for thin section image matching and retrieval, according to some implementations.

FIG. 8 illustrates examples of data used for thin section image matching and retrieval. In some implementations, database 216 is initially constructed based on semi-quantitative, manually-measured, structured (formatted in table) and non-structured interpretations. Non-structured information was extracted from available portable document format (PDF) files. The data from the different mediums are parsed and connected to each other for later use. In some cases, the data can be collected by an expert petrographer where they analyzed each thin section semi-quantitively and performed point counting. In some cases, in database 216, documents are presented in a relatively consistent format, tables follow a relatively strict standard, and images are linked to the associated data by filenames.

Figure 9:
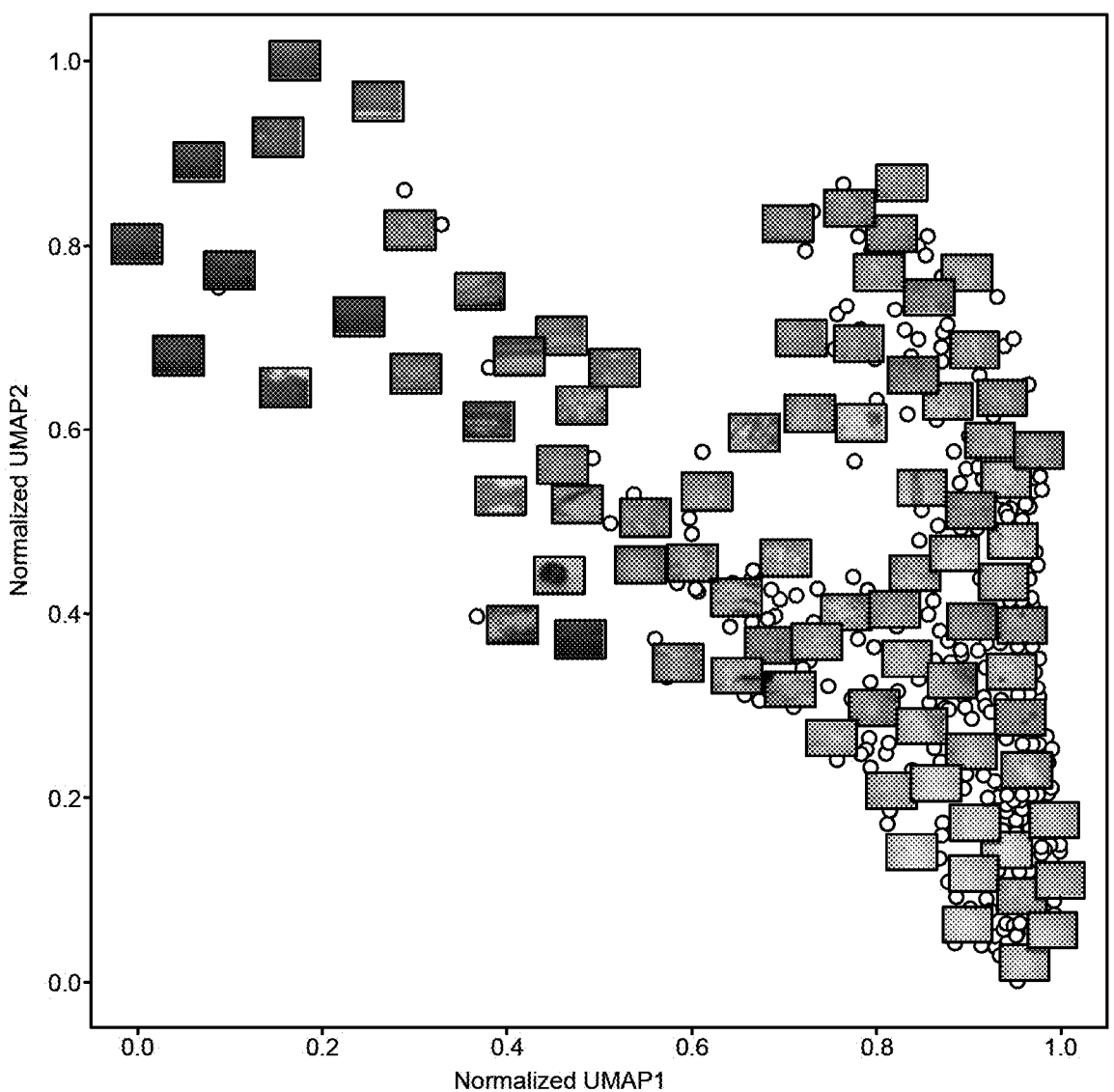
FIG. 9 illustrates an example visualization of image encodings of thin section images in a dataset, according to some implementations.

FIG. 9 illustrates an example visualization of image encodings of thin section images in a dataset. A SimSiam-based image encoding model with a ResNet-18 backbone is trained and applied to 900 thin sections of tight sandstones (i.e., sandstone with low permeability) to generate associated image encodings shown in FIG. 9. The image encoding vector size is set to 512. UMAP is used to reduce the dimensions of the image encodings and visualize the dataset. The circles in FIG. 9 indicate the locations (corresponding to image encodings) of the thin section images in the dataset. A subset of the 900 thin section images is visualized in FIG. 9. Similar thin section images are relatively closer to each other in FIG. 9.

Figure 10:
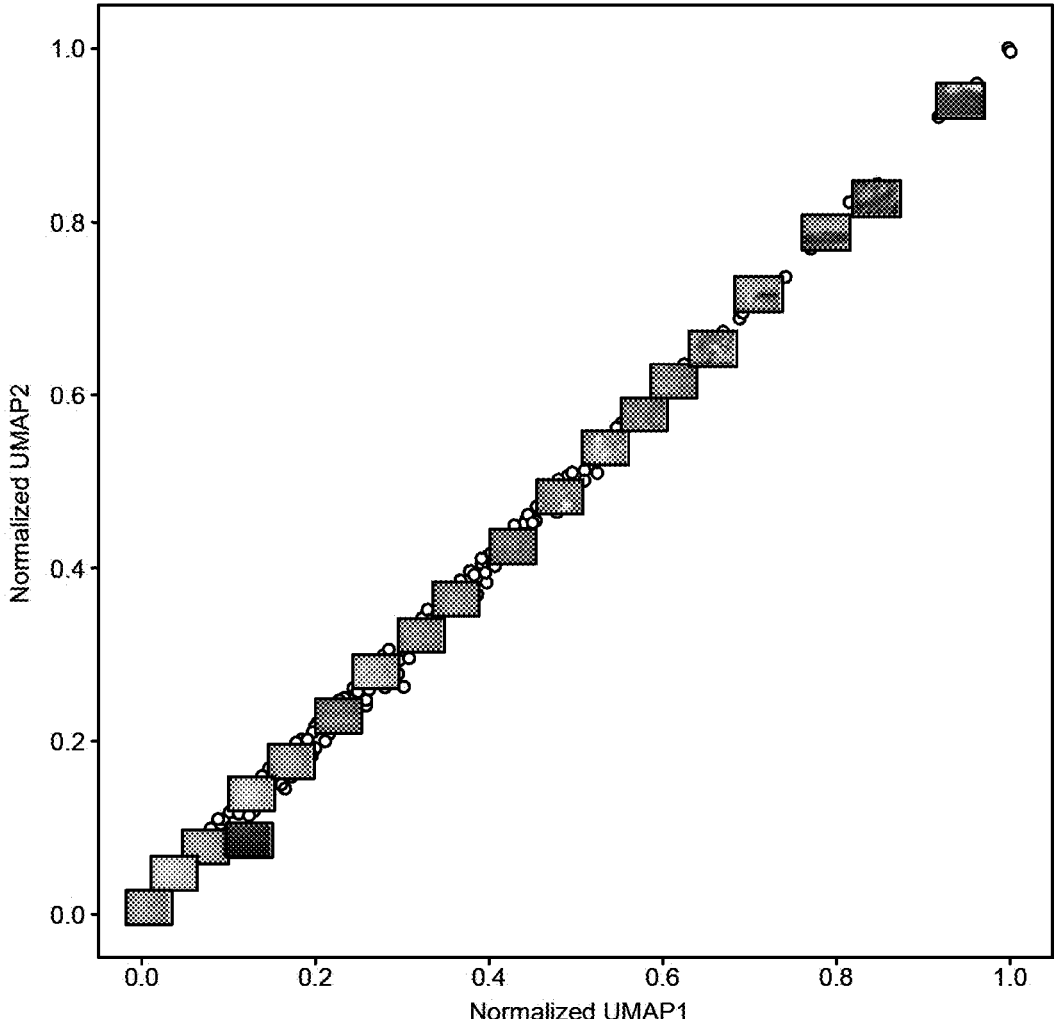
FIG. 10 illustrates another example visualization of image encodings of thin section images in a dataset, according to some implementations.

FIG. 10 illustrates another example visualization of image encodings of thin section images in a dataset. An image-processing-based Haralick feature encoder is applied to the same 900 thin sections of tight sandstones to generate associated image encodings shown in FIG. 10. UMAP is used to reduce the dimensions of the image encodings and visualize the dataset. The circles in FIG. 10 indicate the locations (corresponding to image encodings) of the thin section images in the dataset.

Comparing the results from the machine-learning-based encoder in FIG. 9 with the results of image-processingbased Haralick features encoder in FIG. 10, FIG. 9 shows improvement in the ability of the encoder to separate similar images into groups.

Figure 11:
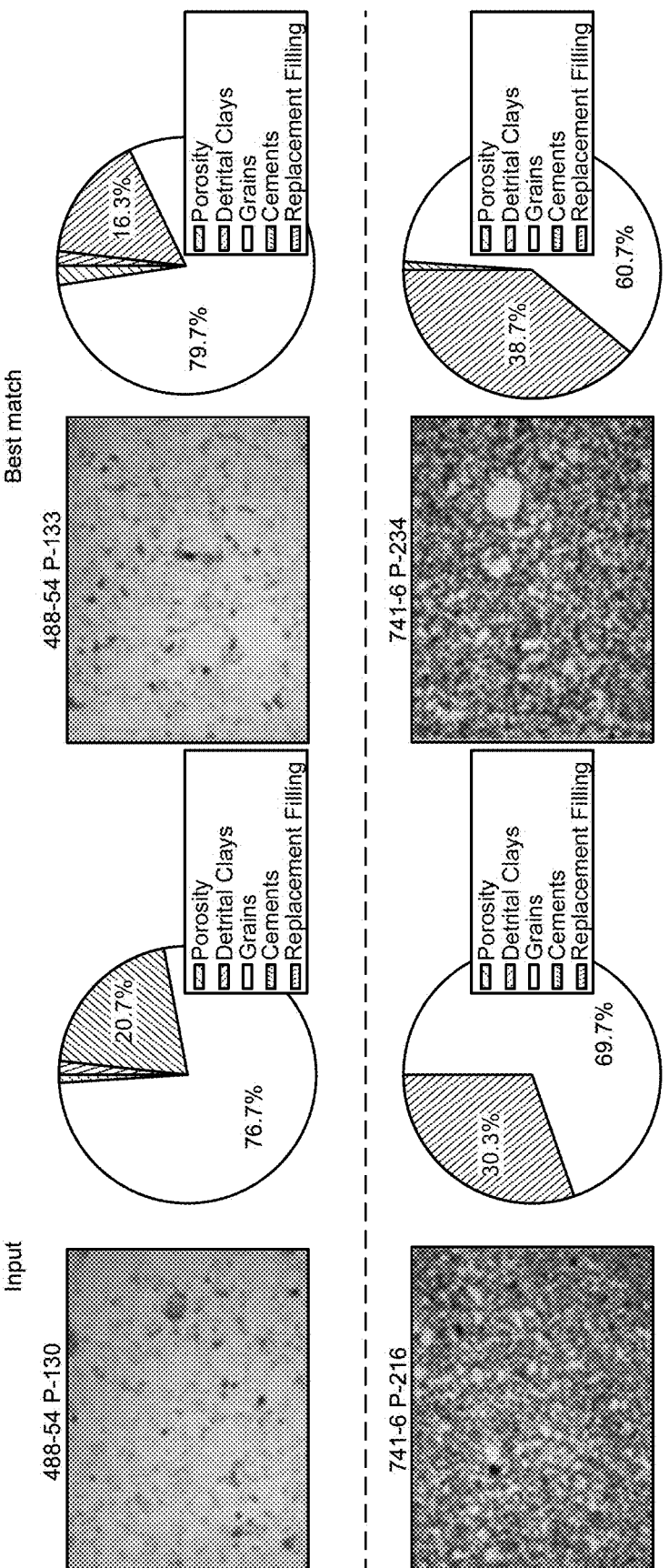
FIG. 11 illustrates example input thin section images and their corresponding matches found in a database, according to some implementations.

FIG. 11 illustrates example input thin section images and their corresponding matches found in a database. The input thin section images and their matches are visually similar. Furthermore, the proportions of rock components are comparable between the input thin section images and their corresponding matches, which indicates that the image encodings capture the major characteristics of the thin section images.

Figure 12:
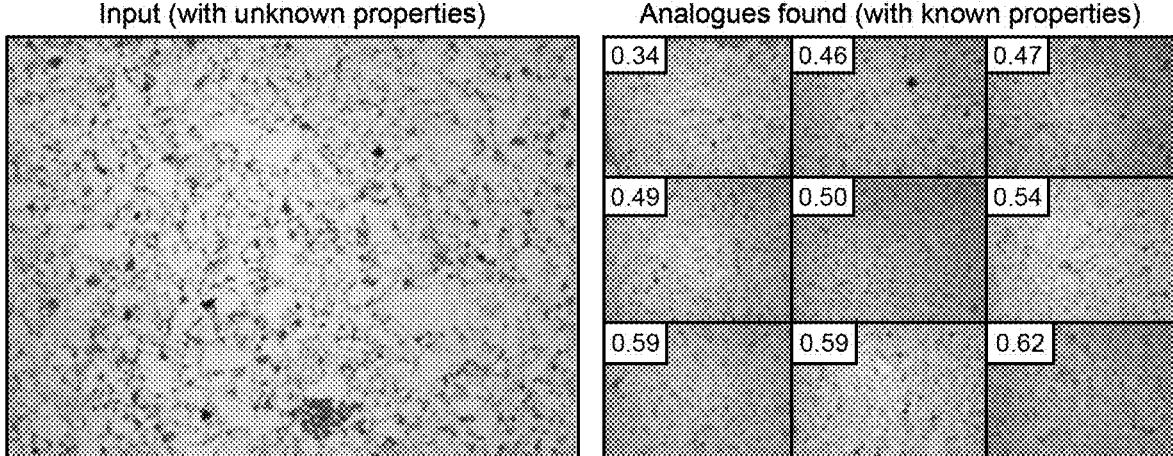
FIG. 12 illustrates examples of multiple matches from a thin section image dataset obtained for an uninterpreted input, according to some implementations.
Figure 13:
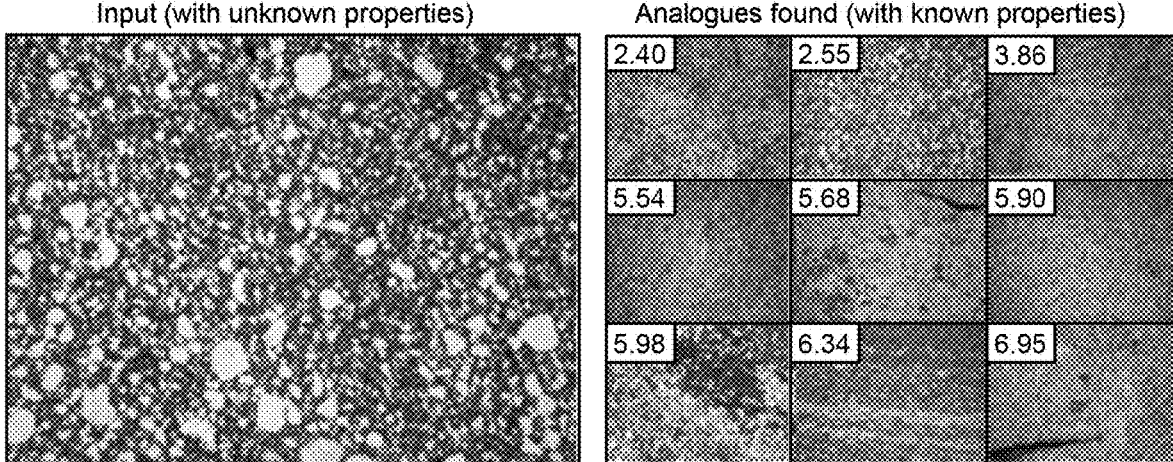
FIG. 13 illustrates examples of multiple matches from another thin section image dataset obtained for another uninterpreted input, according to some implementations.

FIG. 12 illustrates examples of multiple matches from a thin section image dataset obtained for an uninterpreted input. FIG. 13 illustrates examples of multiple matches from another thin section image dataset obtained for another uninterpreted input. In FIG. 12, the obtained matches are visually comparable to the input, while in FIG. 13, the obtained matches are generally not visually comparable to the input. This difference in obtained matches between FIG. 12 and FIG. 13 is quantitively reflected in the distance metrics calculated for the thin section images in the analogues found, where the distance values shown in FIG. 12 are much lower than the distance values shown in FIG. 13. Manual inspection of the dataset used in generating the results in FIG. 13 does not show better matches for the input image in FIG. 13. Therefore, the visual dissimilarities obtained in the matches in FIG. 13 are attributed to the fact that the input image in FIG. 13 is unique, i.e., it does not have an analogue in the searched dataset for FIG. 13. Consequently, when the distance values associated with matching thin sections retrieved from a database are larger than a predefined value, the input thin section sample can be interpreted manually by an expert petrographer without the assistance of the analogues found. The image of the input thin section sample and the new interpretation associated with the sample are then stored in the database to improve the future image search.

Returning to FIG. 2, in some implementations, at 204, manual thin section images can be taken from a microscope instead of using a thin section scanner. In some implementations, at 206, cropping can be performed manually in an image processing software instead of being performed in an automated workflow. In some cases, manual cropping may be preferred if the thin section prepared at 202 is heterogenous enough to exhibit two or more lithological facies, and a petrographer wants to focus on one of them. In some implementations, during image matching and interpretation, a petrographer can use the multiple matches from 210 as a guide to aid in the interpretation rather than relying on the best matches from 210 only.

In some implementations, a major factor in determining the accuracy of image search is the choice of the image encoder. In some cases, using an encoder based on image processing (e.g., based on Haralick features) can produces acceptable results. But as FIG. 9 and FIG. 10 show, the machine learning based encoders can be better at separating similar images into groups. In some cases, a machine-learning encoder with weights trained on a general dataset of unlabeled thin section images can produce results based on random testing. In some cases, finetuning the weights in a machine-learning encoder can enable the image encoding model to encode more textural variations observed in rocks. In some cases, self-supervised learning architectures for images, other than the SimSiam architecture, can be used to train the image encoder. In some cases, image-transformers-based encoders, instead of the convolutional-based encoders, can be used to estimate image encodings at 208 or 222.

In some cases, encoder weights from foundational image models can be used, while performance considerations can be taken into account when large image encoding models are used.

In some implementations, to handle images with variable sizes in a machine-learning-based image encoder, the mean of random patches can be used as an encoding for the images. In some cases, the thin sections are relatively homogenous, and the matching images from 210 can match the thin section image with unknown properties in overall texture rather than specific local details. That being said, other methods can be used to encode variable size images. In some cases, adaptive average pooling can be used in the image encoding model such that the output of the image encoding model is of constant size, independent of the size of the input thin section image. Consequently, no patches need to be sampled and the input image can be encoded as a whole in one go, when computational resources are available. On the other hand, for training the image encoding model, patches can still be extracted to increase the number of samples in the training dataset.

In some implementations, real-time thin section matching can be done by connecting the image encoder to a live image from a microscope. Real-time thin section matching can be useful for work in certain settings, for example, when a thin section scanner is not present, e.g., in a rig setting where analysis is needed in near-real-time by the decision makers. In some cases, the acquisition parameters for thin section scanners are controlled and therefore the thin section scanners can produce more consistent images when compared to manually taken images. For example, thin section scanners can house a thin section inside a compartment. Consequently, lighting conditions of the thin section is not affected by the lighting conditions outside the thin section scanners.

In some implementations, homomorphic encryption can be used in the neural network to enhance data security. In some cases, the dataset (e.g., thin section images, metadata, and associated interpretation) can be stored encrypted in a server with the encryption key maintained by the owner of the data and authorization is only provided to certain users approved by the owner.

FIG. 14 illustrates an example process 1400 for interpreting rock thin sections. For convenience, process 1400 will be described as being performed by a computer system having one or more computers located in one or more locations and programmed appropriately in accordance with this specification. An example of the computer system is the computer system 1500 illustrated in FIG. 15.

At 1402, a computer system obtains multiple first images of rock thin sections, where each of the multiple first images is associated with a respective rock thin section interpretation and a respective image encoding vector.

At 1404, the computer system obtains an image of a rock thin section with unknown properties.

At 1406, the computer system encodes, using an image encoder, the image of the rock thin section with unknown properties to generate an image encoding vector of the image, where the image encoder includes a machine learning based image encoding model or a statistical image feature-based encoder.

At 1408, the computer system selects, based on (1) the image encoding vector of the image of the rock thin section with unknown properties and (2) the respective image encoding vector for each of the multiple first images of rock thin sections, one or more images from the multiple first images.

At 1410, the computer system providing the respective rock thin section interpretation of each of the one or more images for interpreting the rock thin section with unknown properties.

Figure 15:
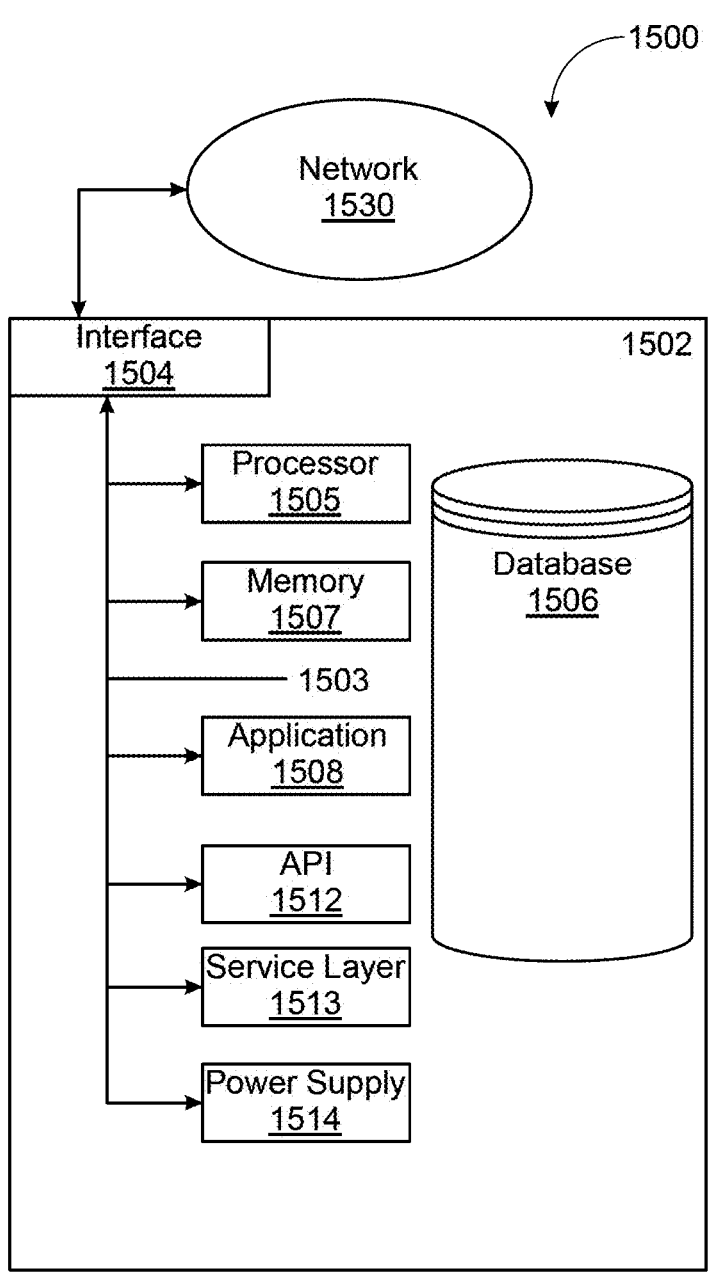
FIG. 15 is a block diagram of an example computer system that can be used to provide computational functionalities associated with described algorithms, methods, functions, processes, flows, and procedures, according to some implementations.

FIG. 15 is a block diagram of an example computer system 1500 that can be used to provide computational functionalities associated with described algorithms, methods, functions, processes, flows, and procedures, according to some implementations of the present disclosure. In some implementations, the computer system performing example 100, example 200, or process 1400 can be the computer system 1500, include the computer system 1500, or the computer system performing example 100, example 200, or process 1400 can communicate with the computer system 1500.

The illustrated computer 1502 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 1502 can include input devices such as keypads, keyboards, and touch screens that can accept user information. Also, the computer 1502 can include output devices that can convey information associated with the operation of the computer 1502. The information can include digital data, visual data, audio information, or a combination of information. The information can be presented in a graphical user interface (UI) (or GUI). In some implementations, the inputs and outputs include display ports (such as DVI-I+2× display ports), USB 3.0, GbE ports, isolated DI/O, SATA-III (6.0 Gb/s) ports, mPCIe slots, a combination of these, or other ports. In instances of an edge gateway, the computer 1502 can include a Smart Embedded Management Agent (SEMA), such as a built-in ADLINK SEMA 2.2, and a video sync technology, such as Quick Sync Video technology supported by ADLINK MSDK+. In some examples, the computer 1502 can include the MXE-5400 Series processor-based fanless embedded computer by ADLINK, though the computer 1502 can take other forms or include other components.

The computer 1502 can serve in a role as a client, a network component, a server, a database, a persistency, or components of a computer system for performing the subject matter described in the present disclosure. The illustrated computer 1502 is communicably coupled with a network 1530. In some implementations, one or more components of the computer 1502 can be configured to operate within different environments, including cloud-computing-based environments, local environments, global environments, and combinations of environments.

At a high level, the computer 1502 is an electronic computing device operable to receive, transmit, process, store, and manage data and information associated with the described subject matter. According to some implementations, the computer 1502 can also include, or be communicably coupled with, an application server, an email server, a web server, a caching server, a streaming data server, or a combination of servers.

The computer 1502 can receive requests over network 1530 from a client application (for example, executing on another computer 1502). The computer 1502 can respond to the received requests by processing the received requests using software applications. Requests can also be sent to the computer 1502 from internal users (for example, from a command console), external (or third) parties, automated applications, entities, individuals, systems, and computers.

Each of the components of the computer 1502 can communicate using a system bus 1503. In some implementations, any or all of the components of the computer 1502, including hardware or software components, can interface with each other or the interface 1504 (or a combination of both), over the system bus. Interfaces can use an application programming interface (API) 1512, a service layer 1513, or a combination of the API 1512 and service layer 1513. The API 1512 can include specifications for routines, data structures, and object classes. The API 1512 can be either computer-language independent or dependent. The API 1512 can refer to a complete interface, a single function, or a set of APIs 1512.

The service layer 1513 can provide software services to the computer 1502 and other components (whether illustrated or not) that are communicably coupled to the computer 1502. The functionality of the computer 1502 can be accessible for all service consumers using this service layer 1513. Software services, such as those provided by the service layer 1513, can provide reusable, defined functionalities through a defined interface. For example, the interface can be software written in JAVA, C++, or a language providing data in extensible markup language (XML) format. While illustrated as an integrated component of the computer 1502, in alternative implementations, the API 1512 or the service layer 1513 can be stand-alone components in relation to other components of the computer 1502 and other components communicably coupled to the computer 1502. Moreover, any or all parts of the API 1512 or the service layer 1513 can be implemented as child or sub-modules of another software module, enterprise application, or hardware module without departing from the scope of the present disclosure.

The computer 1502 can include an interface 1504. Although illustrated as a single interface 1504 in FIG. 15, two or more interfaces 1504 can be used according to particular needs, desires, or particular implementations of the computer 1502 and the described functionality. The interface 1504 can be used by the computer 1502 for communicating with other systems that are connected to the network 1530 (whether illustrated or not) in a distributed environment. Generally, the interface 1504 can include, or be implemented using, logic encoded in software or hardware (or a combination of software and hardware) operable to communicate with the network 1530. More specifically, the interface 1504 can include software supporting one or more communication protocols associated with communications. As such, the network 1530 or the interface's hardware can be operable to communicate physical signals within and outside of the illustrated computer 1502.

The computer 1502 includes a processor 1505. Although illustrated as a single processor 1505 in FIG. 15, two or more processors 1505 can be used according to particular needs, desires, or particular implementations of the computer 1502 and the described functionality. Generally, the processor 1505 can execute instructions and manipulate data to perform the operations of the computer 1502, including operations using algorithms, methods, functions, processes, flows, and procedures as described in the present disclosure.

The computer 1502 can also include a database 1506 that can hold data for the computer 1502 and other components connected to the network 1530 (whether illustrated or not). For example, database 1506 can be an in-memory, conventional, or a database storing data consistent with the present disclosure. In some implementations, the database 1506 can be a combination of two or more different database types (for example, hybrid in-memory and conventional databases) according to particular needs, desires, or particular implementations of the computer 1502 and the described functionality. Although illustrated as a single database 1506 in FIG. 15, two or more databases (of the same, different, or combination of types) can be used according to particular needs, desires, or particular implementations of the computer 1502 and the described functionality. While database 1506 is illustrated as an internal component of the computer 1502, in alternative implementations, database 1506 can be external to the computer 1502.

The computer 1502 also includes a memory 1507 that can hold data for the computer 1502 or a combination of components connected to the network 1530 (whether illustrated or not). Memory 1507 can store any data consistent with the present disclosure. In some implementations, memory 1507 can be a combination of two or more different types of memory (for example, a combination of semiconductor and magnetic storage) according to particular needs, desires, or particular implementations of the computer 1502 and the described functionality. Although illustrated as a single memory 1507 in FIG. 15, two or more memories 1507 (of the same, different, or combination of types) can be used according to particular needs, desires, or particular implementations of the computer 1502 and the described functionality. While memory 1507 is illustrated as an internal component of the computer 1502, in alternative implementations, memory 1507 can be external to the computer 1502.

An application 1508 can be an algorithmic software engine providing functionality according to particular needs, desires, or particular implementations of the computer 1502 and the described functionality. For example, an application 1508 can serve as one or more components, modules, or applications 1508. Multiple applications 1508 can be implemented on the computer 1502. Each application 1508 can be internal or external to the computer 1502.

The computer 1502 can also include a power supply 1514. The power supply 1514 can include a rechargeable or non-rechargeable battery that can be configured to be either user- or non-user-replaceable. In some implementations, the power supply 1514 can include power-conversion and management circuits, including recharging, standby, and power management functionalities. In some implementations, the power-supply 1514 can include a power plug to allow the computer 1502 to be plugged into a wall socket or a power source to, for example, power the computer 1502 or recharge a rechargeable battery.

There can be any number of computers 1502 associated with, or external to, a computer system including computer 1502, with each computer 1502 communicating over network 1530. Further, the terms "client", "user", and other appropriate terminology can be used interchangeably without departing from the scope of the present disclosure. Moreover, the present disclosure contemplates that many users can use one computer 1502 and one user can use multiple computers 1502.

Figure 16:
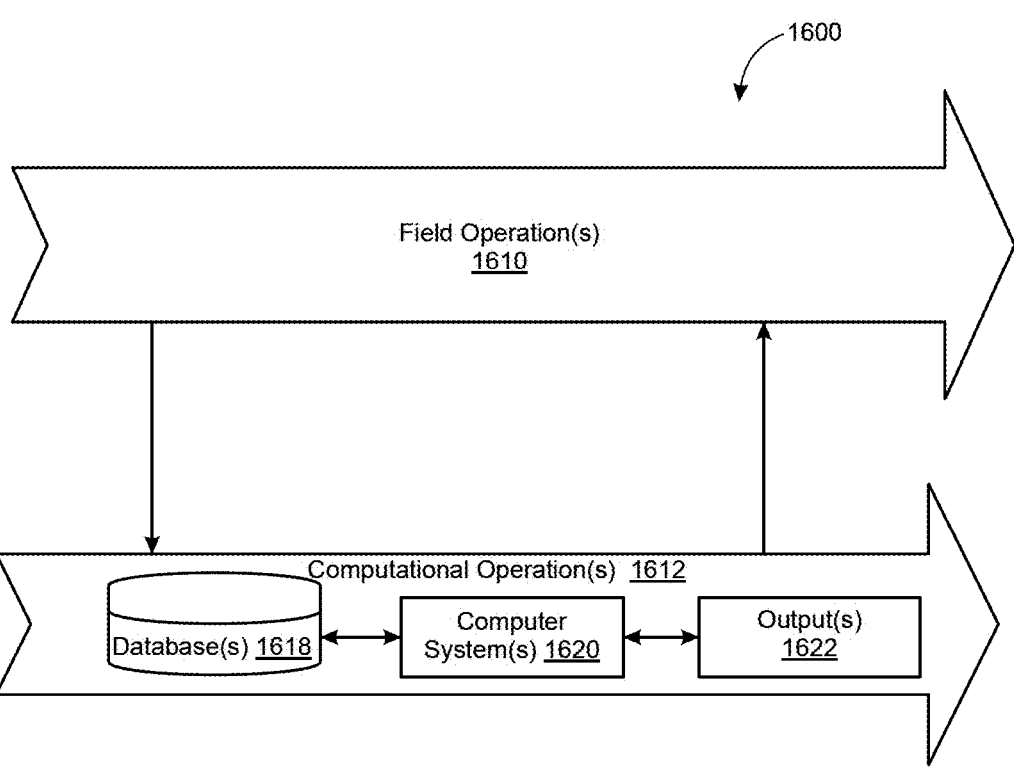
FIG. 16 illustrates hydrocarbon production operations that include both one or more field operations and one or more computational operations, which exchange information and control exploration for the production of hydrocarbons, according to some implementations.

FIG. 16 illustrates hydrocarbon production operations 1600 that include both one or more field operations 1610 and one or more computational operations 1612, which exchange information and control exploration for the production of hydrocarbons. In some implementations, outputs of techniques of the present disclosure can be performed before, during, or in combination with the hydrocarbon production operations 1600, specifically, for example, either as field operations 1610 or computational operations 1612, or both.

Examples of field operations 1610 include forming/drilling a wellbore, hydraulic fracturing, producing through the wellbore, injecting fluids (such as water) through the wellbore, to name a few. In some implementations, methods of the present disclosure can trigger or control the field operations 1610. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 1610 and responsively triggering the field operations 1610 including, for example, generating plans and signals that provide feedback to and control physical components of the field operations 1610. Alternatively, or in addition, the field operations 1610 can trigger the methods of the present disclosure. For example, implementing physical components (including, for example, hardware, such as sensors) deployed in the field operations 1610 can generate plans and signals that can be provided as input or feedback (or both) to the methods of the present disclosure.

Examples of computational operations 1612 include one or more computer systems 1620 that include one or more processors and computer-readable media (e.g., non-transitory computer-readable media) operatively coupled to the one or more processors to execute computer operations to perform the methods of the present disclosure. The computational operations 1612 can be implemented using one or more databases 1618, which store data received from the field operations 1610 and/or generated internally within the computational operations 1612 (e.g., by implementing the methods of the present disclosure) or both. For example, the one or more computer systems 1620 process inputs from the field operations 1610 to assess conditions in the physical world, the outputs of which are stored in the databases 1618. For example, seismic sensors of the field operations 1610 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 1612 where they are stored in the databases 1618 and analyzed by the one or more computer systems 1620.

In some implementations, one or more outputs 1622 generated by the one or more computer systems 1620 can be provided as feedback/input to the field operations 1610 (either as direct input or stored in the databases 1618). The field operations 1610 can use the feedback/input to control physical components used to perform the field operations 1610 in the real world.

For example, the computational operations 1612 can process the seismic data to generate three-dimensional (3D) maps of the subsurface formation. The computational operations 1612 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 1612 to process new information about the formation and control the drilling to adjust to the observed conditions in real-time.

The one or more computer systems 1620 can update the 3D maps of the subsurface formation as information from one exploration well is received and the computational operations 1612 can adjust the location of the next exploration well based on the updated 3D maps. Similarly, the data received from production operations can be used by the computational operations 1612 to control components of the production operations. For example, production well and pipeline data can be analyzed to predict slugging in pipelines leading to a refinery and the computational operations 1612 can control machine operated valves upstream of the refinery to reduce the likelihood of plant disruptions that run the risk of taking the plant offline.

In some implementations of the computational operations 1612, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Implementations of the subject matter and the functional operations described in this specification can be implemented in digital electronic circuitry, in tangibly embodied computer software or firmware; in computer hardware, including the structures disclosed in this specification and their structural equivalents; or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus", "computer", and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus and special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document; in a single file dedicated to the program in question; or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes; the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks, optical memory devices, and technologies including, for example, digital video disc (DVD), CD ROM, DVD+/− R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), or a plasma monitor.

Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser. Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations; and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

EMBODIMENTS

Embodiment 1: A computer-implemented method comprising obtaining a first plurality of images of rock thin sections, wherein each of the first plurality of images is associated with a respective rock thin section interpretation and a respective image encoding vector; obtaining an image of a rock thin section with unknown properties; encoding, using an image encoder, the image of the rock thin section with unknown properties to generate an image encoding vector of the image, wherein the image encoder comprises a machine learning based image encoding model or a statistical image feature-based encoder; selecting, based on (1) the image encoding vector of the image of the rock thin section with unknown properties and (2) the respective image encoding vector for each of the first plurality of images of rock thin sections, one or more images from the first plurality of images; and providing the respective rock thin section interpretation of each of the one or more images for interpreting the rock thin section with unknown properties.

Embodiment 2: The computer-implemented method of embodiment 1, wherein the image encoder comprises the machine learning based image encoding model, and the computer-implemented method further comprises: before obtaining the first plurality of images of rock thin sections, training, in a self-supervised learning process and based on a second plurality of images of rock thin sections, the machine learning based image encoding model; and generating, using the trained machine learning based image encoding model, the respective image encoding vector of each of the first plurality of images.

Embodiment 3: The computer-implemented method of embodiment 2, wherein the machine learning based image encoding model comprises a convolutional neural network (CNN) backbone and a multilayer perceptron (MLP) head.

Embodiment 4: The computer-implemented method of any one of embodiments 1 to 3, wherein the image encoder comprises the statistical image feature-based encoder, and the image encoding vector of the image of the rock thin section with unknown properties comprises Haralick features of the image of the rock thin section with unknown properties.

Embodiment 5: The computer-implemented method of any one of embodiments 1 to 4, wherein selecting the one or more images from the first plurality of images comprises: determining a respective distance between the image encoding vector of the image of the rock thin section with unknown properties and the respective image encoding vector for each of the first plurality of images of rock thin sections; and selecting, based on the determined respective distance between the image encoding vector of the image of the rock thin section with unknown properties and the respective image encoding vector for each of the first plurality of images of rock thin sections, the one or more images from the first plurality of images.

Embodiment 6: The computer-implemented method of any one of embodiments 1 to 5, further comprising: after providing the respective rock thin section interpretation of each of the one or more images for interpreting the rock thin section with unknown properties, storing, in a database that stores the first plurality of images of rock thin sections, the image of the rock thin section with unknown properties and the interpretation of the image.

Embodiment 7: The computer-implemented method of any one of embodiments 1 to 6, wherein obtaining the first plurality of images of rock thin sections comprises obtaining, from a database, each of the first plurality of images of rock thin sections, the respective rock thin section interpretation, and the respective image encoding vector.

Embodiment 8: The computer-implemented method of any one of embodiments 1 to 7, wherein obtaining the image of the rock thin section with unknown properties comprises scanning the rock thin section with unknown properties using a thin section scanner to obtain the image of the rock thin section with unknown properties.

Embodiment 9: A non-transitory computer-readable medium storing one or more instructions executable by a computer system to perform operations comprising: obtaining a first plurality of images of rock thin sections, wherein each of the first plurality of images is associated with a respective rock thin section interpretation and a respective image encoding vector; obtaining an image of a rock thin section with unknown properties; encoding, using an image encoder, the image of the rock thin section with unknown properties to generate an image encoding vector of the image, wherein the image encoder comprises a machine learning based image encoding model or a statistical image feature-based encoder; selecting, based on (1) the image encoding vector of the image of the rock thin section with unknown properties and (2) the respective image encoding vector for each of the first plurality of images of rock thin sections, one or more images from the first plurality of images; and providing the respective rock thin section interpretation of each of the one or more images for interpreting the rock thin section with unknown properties.

Embodiment 10: The non-transitory computer-readable medium of embodiment 9, wherein the image encoder comprises the machine learning based image encoding model, and the operations further comprise: before obtaining the first plurality of images of rock thin sections, training, in a self-supervised learning process and based on a second plurality of images of rock thin sections, the machine learning based image encoding model; and generating, using the trained machine learning based image encoding model, the respective image encoding vector of each of the first plurality of images.

Embodiment 11: The non-transitory computer-readable medium of embodiment 9 or 10, wherein the image encoder comprises the statistical image feature-based encoder, and the image encoding vector of the image of the rock thin section with unknown properties comprises Haralick features of the image of the rock thin section with unknown properties.

Embodiment 12: The non-transitory computer-readable medium of any one of embodiments 9 to 11, wherein selecting the one or more images from the first plurality of images comprises: determining a respective distance between the image encoding vector of the image of the rock thin section with unknown properties and the respective image encoding vector for each of the first plurality of images of rock thin sections; and selecting, based on the determined respective distance between the image encoding vector of the image of the rock thin section with unknown properties and the respective image encoding vector for each of the first plurality of images of rock thin sections, the one or more images from the first plurality of images.

Embodiment 13: The non-transitory computer-readable medium of any one of embodiments 9 to 12, wherein the operations further comprise: after providing the respective rock thin section interpretation of each of the one or more images for interpreting the rock thin section with unknown properties, storing, in a database that stores the first plurality of images of rock thin sections, the image of the rock thin section with unknown properties and the interpretation of the image.

Embodiment 14: The non-transitory computer-readable medium of any one of embodiments 9 to 13, wherein obtaining the image of the rock thin section with unknown properties comprises scanning the rock thin section with unknown properties using a thin section scanner to obtain the image of the rock thin section with unknown properties.

Embodiment 15: A computer-implemented system, comprising one or more computers; and one or more computer memory devices interoperably coupled with the one or more computers and having tangible, non-transitory, machine-readable media storing one or more instructions that, when executed by the one or more computers, perform one or more operations comprising: obtaining a first plurality of images of rock thin sections, wherein each of the first plurality of images is associated with a respective rock thin section interpretation and a respective image encoding vector; obtaining an image of a rock thin section with unknown properties; encoding, using an image encoder, the image of the rock thin section with unknown properties to generate an image encoding vector of the image, wherein the image encoder comprises a machine learning based image encoding model or a statistical image feature-based encoder; selecting, based on (1) the image encoding vector of the image of the rock thin section with unknown properties and (2) the respective image encoding vector for each of the first plurality of images of rock thin sections, one or more images from the first plurality of images; and providing the respective rock thin section interpretation of each of the one or more images for interpreting the rock thin section with unknown properties.

Embodiment 16: The computer-implemented system of claim 15, wherein the image encoder comprises the machine learning based image encoding model, and the one or more operations further comprise: before obtaining the first plurality of images of rock thin sections, training, in a self-supervised learning process and based on a second plurality of images of rock thin sections, the machine learning based image encoding model; and generating, using the trained machine learning based image encoding model, the respective image encoding vector of each of the first plurality of images.

Embodiment 17: The computer-implemented system of claim 15 or 16, wherein the image encoder comprises the statistical image feature-based encoder, and the image encoding vector of the image of the rock thin section with unknown properties comprises Haralick features of the image of the rock thin section with unknown properties.

Embodiment 18: The computer-implemented system of any one of embodiments 15 to 17, wherein selecting the one or more images from the first plurality of images comprises: determining a respective distance between the image encoding vector of the image of the rock thin section with unknown properties and the respective image encoding vector for each of the first plurality of images of rock thin sections; and selecting, based on the determined respective distance between the image encoding vector of the image of the rock thin section with unknown properties and the respective image encoding vector for each of the first plurality of images of rock thin sections, the one or more images from the first plurality of images.

Embodiment 19: The computer-implemented system of any one of embodiments 15 to 18, wherein the one or more operations further comprise: after providing the respective rock thin section interpretation of each of the one or more images for interpreting the rock thin section with unknown properties, storing, in a database that stores the first plurality of images of rock thin sections, the image of the rock thin section with unknown properties and the interpretation of the image.

Embodiment 20: The computer-implemented system of any one of embodiments 15 to 19, wherein obtaining the image of the rock thin section with unknown properties comprises scanning the rock thin section with unknown properties using a thin section scanner to obtain the image of the rock thin section with unknown properties.

We claim:

1. A computer-implemented method comprising:
obtaining a first plurality of images of rock thin sections, wherein each of the first plurality of images is associated with a respective rock thin section interpretation and a respective image encoding vector;

obtaining an image of a rock thin section with unknown properties;
encoding, using an image encoder, the image of the rock thin section with unknown properties to generate an image encoding vector of the image, wherein the image encoder comprises a machine learning based image encoding model or a statistical image feature-based encoder;
selecting, based on (1) the image encoding vector of the image of the rock thin section with unknown properties and (2) the respective image encoding vector for each of the first plurality of images of rock thin sections, one or more images from the first plurality of images; and
providing the respective rock thin section interpretation of each of the one or more images for interpreting the rock thin section with unknown properties.

2. The computer-implemented method of claim 1, wherein the image encoder comprises the machine learning based image encoding model, and the computer-implemented method further comprises:
before obtaining the first plurality of images of rock thin sections:
training, in a self-supervised learning process and based on a second plurality of images of rock thin sections, the machine learning based image encoding model; and
generating, using the trained machine learning based image encoding model, the respective image encoding vector of each of the first plurality of images.

3. The computer-implemented method of claim 2, wherein the machine learning based image encoding model comprises a convolutional neural network (CNN) backbone and a multilayer perceptron (MLP) head.

4. The computer-implemented method of claim 1, wherein the image encoder comprises the statistical image feature-based encoder, and the image encoding vector of the image of the rock thin section with unknown properties comprises Haralick features of the image of the rock thin section with unknown properties.

5. The computer-implemented method of claim 1, wherein selecting the one or more images from the first plurality of images comprises:
determining a respective distance between the image encoding vector of the image of the rock thin section with unknown properties and the respective image encoding vector for each of the first plurality of images of rock thin sections; and
selecting, based on the determined respective distance between the image encoding vector of the image of the rock thin section with unknown properties and the respective image encoding vector for each of the first plurality of images of rock thin sections, the one or more images from the first plurality of images.

6. The computer-implemented method of claim 1, further comprising:
after providing the respective rock thin section interpretation of each of the one or more images for interpreting the rock thin section with unknown properties, storing, in a database that stores the first plurality of images of rock thin sections, the image of the rock thin section with unknown properties and the interpretation of the image.

7. The computer-implemented method of claim 1, wherein obtaining the first plurality of images of rock thin sections comprises obtaining, from a database, each of the first plurality of images of rock thin sections, the respective rock thin section interpretation, and the respective image encoding vector.

8. The computer-implemented method of claim 1, wherein obtaining the image of the rock thin section with unknown properties comprises scanning the rock thin section with unknown properties using a thin section scanner to obtain the image of the rock thin section with unknown properties.

9. The computer-implemented method of claim 1, wherein selecting the one or more images from the first plurality of images is based on an encoding space comprising the image encoding vector of the image of the rock thin section with unknown properties and the respective image encoding vector for each of the first plurality of images of rock thin sections.

10. A non-transitory computer-readable medium storing one or more instructions executable by a computer system to perform operations comprising:

obtaining a first plurality of images of rock thin sections, wherein each of the first plurality of images is associated with a respective rock thin section interpretation and a respective image encoding vector;

obtaining an image of a rock thin section with unknown properties;

encoding, using an image encoder, the image of the rock thin section with unknown properties to generate an image encoding vector of the image, wherein the image encoder comprises a machine learning based image encoding model or a statistical image feature-based encoder;

selecting, based on (1) the image encoding vector of the image of the rock thin section with unknown properties and (2) the respective image encoding vector for each of the first plurality of images of rock thin sections, one or more images from the first plurality of images; and providing the respective rock thin section interpretation of each of the one or more images for interpreting the rock thin section with unknown properties.

11. The non-transitory computer-readable medium of claim 10, wherein the image encoder comprises the machine learning based image encoding model, and the operations further comprise:

before obtaining the first plurality of images of rock thin sections:

training, in a self-supervised learning process and based on a second plurality of images of rock thin sections, the machine learning based image encoding model; and generating, using the trained machine learning based image encoding model, the respective image encoding vector of each of the first plurality of images.

12. The non-transitory computer-readable medium of claim 10, wherein the image encoder comprises the statistical image feature-based encoder, and the image encoding vector of the image of the rock thin section with unknown properties comprises Haralick features of the image of the rock thin section with unknown properties.

13. The non-transitory computer-readable medium of claim 10, wherein selecting the one or more images from the first plurality of images comprises:

determining a respective distance between the image encoding vector of the image of the rock thin section with unknown properties and the respective image encoding vector for each of the first plurality of images of rock thin sections; and selecting, based on the determined respective distance between the image encoding vector of the image of the rock thin section with unknown properties and the respective image encoding vector for each of the first plurality of images of rock thin sections, the one or more images from the first plurality of images.

14. The non-transitory computer-readable medium of claim 10, wherein the operations further comprise:

after providing the respective rock thin section interpretation of each of the one or more images for interpreting the rock thin section with unknown properties, storing, in a database that stores the first plurality of images of rock thin sections, the image of the rock thin section with unknown properties and the interpretation of the image.

15. The non-transitory computer-readable medium of claim 10, wherein obtaining the image of the rock thin section with unknown properties comprises scanning the rock thin section with unknown properties using a thin section scanner to obtain the image of the rock thin section with unknown properties.

16. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining a first plurality of images of rock thin sections, wherein each of the first plurality of images is associated with a respective rock thin section interpretation and a respective image encoding vector;

obtaining an image of a rock thin section with unknown properties;

encoding, using an image encoder, the image of the rock thin section with unknown properties to generate an image encoding vector of the image, wherein the image encoder comprises a machine learning based image encoding model or a statistical image feature-based encoder;

selecting, based on (1) the image encoding vector of the image of the rock thin section with unknown properties and (2) the respective image encoding vector for each of the first plurality of images of rock thin sections, one or more images from the first plurality of images; and providing the respective rock thin section interpretation of each of the one or more images for interpreting the rock thin section with unknown properties.

17. The computer-implemented system of claim 16, wherein the image encoder comprises the machine learning based image encoding model, and the one or more operations further comprise:

before obtaining the first plurality of images of rock thin sections:

training, in a self-supervised learning process and based on a second plurality of images of rock thin sections, the machine learning based image encoding model; and generating, using the trained machine learning based image encoding model, the respective image encoding vector of each of the first plurality of images.

18. The computer-implemented system of claim 16, wherein the image encoder comprises the statistical image feature-based encoder, and the image encoding vector of the image of the rock thin section with unknown properties comprises Haralick features of the image of the rock thin section with unknown properties.

19. The computer-implemented system of claim 16, wherein selecting the one or more images from the first plurality of images comprises:

determining a respective distance between the image encoding vector of the image of the rock thin section with unknown properties and the respective image encoding vector for each of the first plurality of images of rock thin sections; and selecting, based on the determined respective distance between the image encoding vector of the image of the rock thin section with unknown properties and the respective image encoding vector for each of the first plurality of images of rock thin sections, the one or more images from the first plurality of images.

20. The computer-implemented system of claim 16, wherein the one or more operations further comprise:

after providing the respective rock thin section interpretation of each of the one or more images for interpreting the rock thin section with unknown properties, storing, in a database that stores the first plurality of images of rock thin sections, the image of the rock thin section with unknown properties and the interpretation of the image.

\*　\*　\*　\*　\*